(12) United States Patent
Meyering et al.

(10) Patent No.: US 6,264,044 B1
(45) Date of Patent: Jul. 24, 2001

(54) REINFORCED, THREE ZONE MICROPOROUS MEMBRANE

(75) Inventors: Mark T Meyering, Middlefield; Jack H. Vining, Jr., Coventry; C. Thomas Badenhop, Westport, all of CT (US)

(73) Assignee: Cuno, Inc.

( * ) Notice: Subject to any disclaimer, the term of this patent is extended or adjusted under 35 U.S.C. 154(b) by 0 days.

(21) Appl. No.: 09/040,979

(22) Filed: Mar. 18, 1998

Related U.S. Application Data

(60) Provisional application No. 60/043,181, filed on Apr. 11, 1997.

(51) Int. Cl.[7] .................................................. B01D 39/00
(52) U.S. Cl. .......................... 210/490; 210/507; 210/508; 210/645; 210/500.27
(58) Field of Search ..................................... 210/488, 489, 210/490, 504, 506, 507, 508, 500.36, 500.38, 500.42, 645, 500.27; 55/524; 96/7, 9, 11, 12, 13

(56) References Cited

U.S. PATENT DOCUMENTS

| | | |
|---|---|---|
| 3,876,738 | 4/1975 | Marinaccio et al. . |
| 3,969,548 | 7/1976 | Hunter et al. . |
| 4,340,479 | 7/1982 | Pall . |
| 4,340,480 | 7/1982 | Pall et al. . |
| 4,473,474 | 9/1984 | Ostreicher et al. . |
| 4,473,475 | 9/1984 | Barnes, Jr. et al. . |
| 4,645,602 | 2/1987 | Barnes, Jr. et al. . |
| 4,707,265 | 11/1987 | Barnes, Jr. et al. . |
| 4,844,805 | 7/1989 | Solomon . |
| 4,894,157 | 1/1990 | Johnson . |
| 4,976,901 | 12/1990 | Beck et al. . |
| 5,006,247 | 4/1991 | Dennison et al. . |
| 5,376,273 | 12/1994 | Pacheco et al. . |
| 5,433,859 | 7/1995 | Degen . |
| 5,500,167 | 3/1996 | Degen . |
| 5,525,376 | 6/1996 | Leonard . |
| 5,533,675 | 7/1996 | Benecke et al. . |

FOREIGN PATENT DOCUMENTS

| | | |
|---|---|---|
| 8907667 | 6/1990 | (DE) . |
| 9830379 | 7/1998 | (WO) . |

OTHER PUBLICATIONS

May 11, 1999 PCT International Search Report.

*Primary Examiner*—Ana Fortuna
*Assistant Examiner*—Richard W. Ward
(74) *Attorney, Agent, or Firm*—Cummings & Lockwood

(57) ABSTRACT

A three zone, reinforced, continuous, geometrically symmetrical microporous membrane including a porous support material encapsulated within a middle zone disposed between an upper zone and a lower zone wherein at least one of the three zones has a pore size at least about twenty (20%) percent greater than the pore size of the other two zones is disclosed. Apparatus and methods for fabricating three zone reinforced, continuous, geometrically symmetrical, microporous membrane are also disclosed.

75 Claims, 10 Drawing Sheets

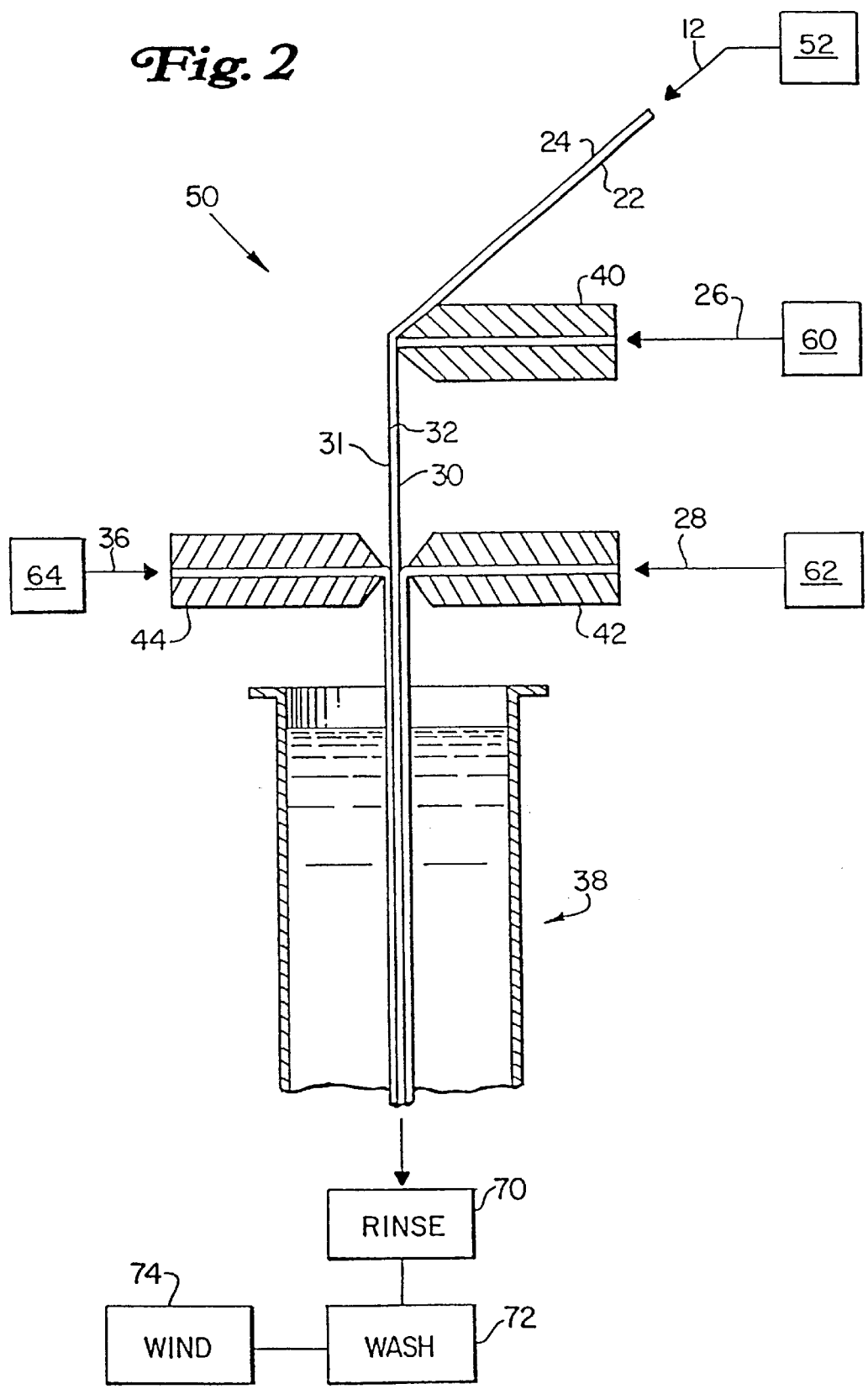

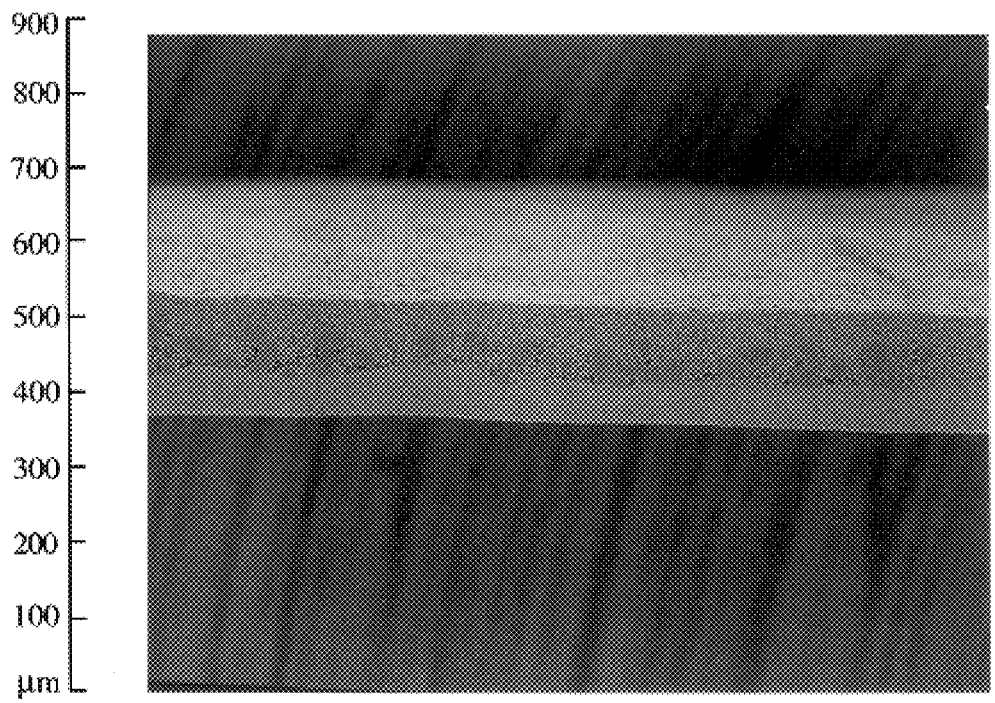
Figure 5a
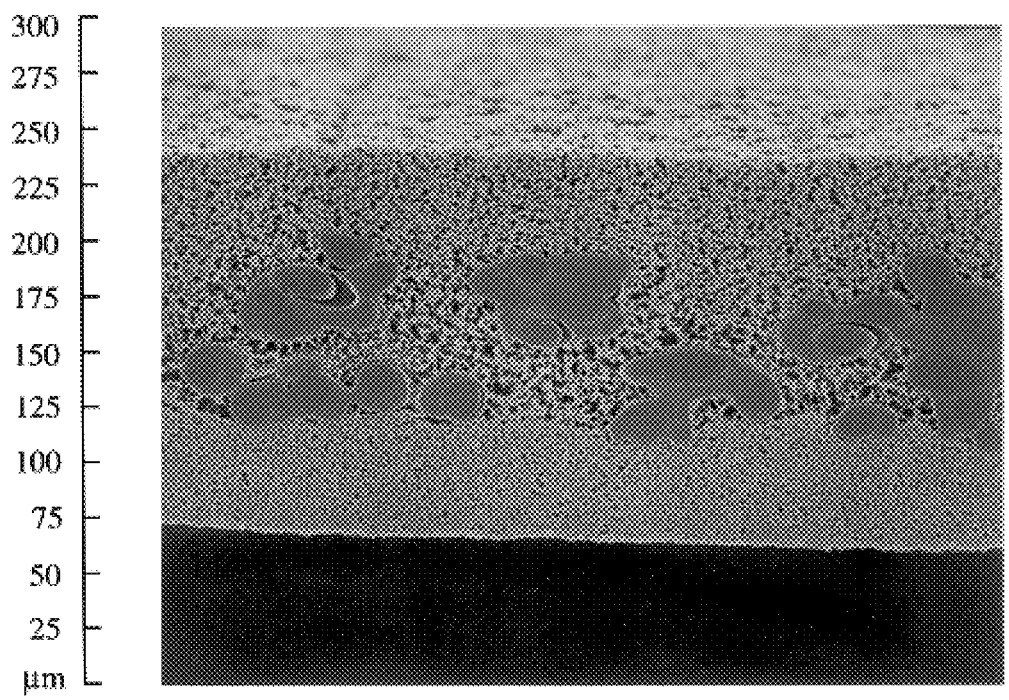
Figure 5b  300 X

REINFORCED, THREE ZONE MICROPOROUS MEMBRANE

RELATED APPLICATION

This application is related to commonly owned U.S. Provisional Patent Application Ser. No. 60/043,181, filed Apr. 11, 1997, of Meyering et al., the disclosure of which is herein incorporated by reference.

BACKGROUND OF THE INVENTION

The present invention relates to continuous, reinforced, geometrically symmetrical, microporous membranes having three distinct pore zones and to processes of making and using same, more particularly to reinforced microporous membranes including a scrim having two sides at least substantially encapsulated within a first dope and at least one additional dope coated onto each side of the encapsulated scrim prior to the first dope being quenched and, most particularly, to a geometrically symmetric, continuous, reinforced membrane having three distinct pore zones including a scrim at least substantially and preferably, completely encapsulated by a relatively large pore size middle zone and two outer zones, one on each side of the middle zone, at least one of the three zones having a pore size at least about twenty (20%) percent greater than the other zones.

Microporous phase inversion membranes are well known in the art. Microporous phase inversion membranes are porous solids which contain microporous interconnecting passages that extend from one surface to the other. These passages provide tortuous tunnels or paths through which the liquid which is being filtered must pass. The particles contained in the liquid passing through a microporous phase inversion membrane become trapped on or in the membrane structure effecting filtration. A slight pressure, generally in the range of about two (2) to about fifty (50) psid (pounds per square inch differential) is used to force fluid through the microporous phase inversion membrane. The particles in the liquid that are larger than the pores are either prevented from entering the membrane or are trapped within the membrane pores and some particles that are smaller than the pores are also trapped or absorbed into the membrane pore structure within the pore tortuous path. The liquid and some particles smaller than the pores of the membrane pass through. Thus, a microporous phase inversion membrane prevents particles of a certain size or larger from passing through it, while at the same time permitting liquid and some particles smaller than that certain size to pass through. Microporous phase inversion membranes have the ability to retain particles in the size range of from about 0.01 or smaller to about 10.0 microns or larger.

Many important micron and submicron size particles can be separated using microporous membranes. For example, red blood cells are about eight (8) microns in diameter, platelets are about two (2) microns in diameter and bacteria and yeast are about 0.5 microns or smaller in diameter. It is possible to remove bacteria from water by passing the water through a microporous membrane having a pore size smaller than the bacteria. Similarly, a microporous membrane can remove invisible suspended particles from water used in the manufacture of integrated circuits in the electronics industry. Microporous membranes are characterized by bubble point tests, which involve measuring the pressure to force either the first air bubble out of a fully wetted phase inversion membrane (the initial Bubble Point, or "IBP"), and the higher pressure which forces air out of the majority of pores all over the phase inversion membrane (foam-all-over-point or "FAOP"). The procedures for conducting initial bubble point and FAOP tests are discussed in U.S. Pat. No. 4,645,602 issued Feb. 24, 1987, the disclosure of which is herein incorporated by reference. The procedure for the initial bubble point test and the more common Mean Flow Pore tests are explained in detail, for example, in ASTM F316-70 and ANS/ASTM F316-70 (Reapproved 1976) which are incorporated herein by reference. The bubble point values for microporous phase inversion membranes are generally in the range of about two (2) to about one hundred (100) psig, depending on the pore size and the wetting fluid.

U.S. Pat. No. 3,876,738, the disclosure of which is herein incorporated by reference, describes a process for preparing microporous membranes by quenching a solution of a film-forming polymer in a non-solvent system for the polymer. U.S. Pat. No. 4,340,479, the disclosure of which is herein incorporated by reference, generally describes the preparation of skinless microporous polyamide membranes by casting a polyamide resin solution onto a substrate and quenching the resulting thin film of polyamide.

Since the mechanical strength of some microporous membranes is poor, it is known to reinforce such membranes with a porous support material to improve mechanical properties and facilitate handling and processing. Accordingly, the aforementioned U.S. Pat. No. 4,340,479 describes a procedure wherein a polymer solution is directly cast onto a porous support material so that the polymer solution penetrates the support material during casting and becomes firmly adhered thereto during formation of the reinforced inner layer of a composite microporous membrane. The support material preferably possesses an open structure so that pressure drop across the composite membrane is minimized. U.S. Pat. No. 4,340,479 further discloses combining two or more microporous membranes, one of which may be reinforced, to form a dual or triple layered structure which is dried under conditions of restraint to produce a single sheet having particle removal characteristics superior to those of individual layers.

U.S. Pat. No. 4,707,265, the disclosure of which is herein incorporated by reference, discloses a reinforced laminated filtration membrane comprising a porous reinforcing web impregnated with a polymeric microporous inner membrane and at least one polymeric microporous outer qualifying membrane laminated to each side of the impregnated web. The pore size of the inner membrane is greater than the pore size of the outer membranes. In this manner, the imperfections, e.g., fiber bundles, broken fibers, void areas, and the like, which are invariably present in the reinforcing web are confined to a coarse, more open inner membrane and the tighter outer qualifying layers are strengthened and supported by the web. The qualifying layers are not affected by imperfections present within the reinforcing web. Further, the use of a coarse, large pore size inner membrane layer insures that there is no substantial pressure drop of fluid across the reinforcing web.

The membranes disclosed in U.S. Pat. No. 4,707,265 are complicated and costly to produce since three separate operations are required to produce the composite membrane: first, the impregnated reinforced membrane support layer is produced, second, the non-reinforced qualifying layers are produced and, third, the impregnated reinforced membrane support layer and the non-reinforced qualifying layers are laminated to form the multilayer composite microporous membrane.

Due to processing and handling restraints, there is a limit to how thin the impregnated reinforced membrane support layer and the non-reinforced qualifying layers can be. As a result, the multilayer composite microporous membrane of U.S. Pat. No. 4,707,265 is at least about ten (10) mils thick. Furthermore, the overall pore size of the composite membrane described in U.S. Pat. No. 4,707,265 is generally limited to the range of approximately 0.45 microns or lower due to the difficulties of separately producing and handling non-reinforced qualifying layers having pore sizes of as high as about 0.45 micron. Thus, the utility of the laminated composite membrane is limited to sterilizing applications and other applications where membranes having about 0.65, 0.8, 1.2, 3.0 and greater micron ratings are not needed.

As the thickness of a membrane increases, pressure drop increases, flow rate worsens and the performance characteristics of the membrane are adversely affected. For example, with increasing thickness the total number of pleats in a pleated cartridge element decreases, thereby reducing the effective surface area available for filtration. Furthermore, a mechanical strain exists at the crest of each pleat and increases with increasing thickness. As a result, thick membranes are more likely to crack during the pleating, edge-seaming, etc. operations that are attendant to the production of pleated filter cartridge elements or during oxidative hydrolytic exposure or multiple steam cycling. Therefore, mechanical strains, which can never be fully relieved after cartridge fabrication, may decrease the useful life of the product and may lead to early failure in integrity.

U.S. Pat. No. 4,770,777 overcomes some of the shortcomings of the process disclosed in U.S. Pat. No. 4,707,265 by completely saturating the reinforcing web with a large pore size (coarser) membrane casting solution, applying a small pore size membrane casting solution on one side of the coated web and then quenching the large and small pore size casting solutions from only one side to provide a continuous, geometrically asymmetric membrane possessing a pore size gradient. Thus, the lamination step of U.S. Pat. No. 4,707,265 is eliminated, along with the necessity of handling the fragile non-reinforced qualifying layers. Further, following the teachings of this patent, it is not possible to apply another casting solution on the other side of the large pore size reinforced web containing layer. Thus, the only additional layers can be cast on top of the second layer cast on the first layer that includes the woven material. Additionally, the membrane taught in U.S. Pat. No. 4,770,777 is a skinned membrane. Accordingly, such membrane suffers from drawbacks associated with skinned microporous membranes, in particular, high pressure drop, poor structural integrity, susceptibility to skin breach, propensity to becoming fouled by debris, etc.

U.S. Pat. No. 5,433,859 attempts to address some of the deficiencies, in particular, high pressure drop, of the skinned membrane disclosed in U.S. Pat. No. 4,770,777 by proposing, preferably, an incomplete impregnation of the reinforcing web with coarse membrane casting solution so that a portion of the reinforcing web having a thickness of about 50 microns is not embedded within the microporous membrane. The low flow resistance of that portion of the reinforcing web which is not embedded within the microporous membrane ensures that filtered fluid passing through the supported microporous membrane will not have a significant adverse impact on the pressure drop across the filtration element.

While the membrane disclosed in U.S. Pat. No. 5,433,859 exhibits lower pressure drop across the membrane compared to the skinned membrane disclosed in U.S. Pat. No. 4,770,777, the membrane does have significant structural drawbacks. First, the membrane suffers from tremendous geometric asymmetry around the central axis of the reinforcing web, i.e., the thickness of the membrane varies on each side of the reinforcing web. As a result, when the membrane is pleated, the mechanical strain on the thick side of the membrane is greater than on the thin side of the membrane. This differential in mechanical strain increases the possibility of stress crack formation and failure of the integrity of the membrane. Second, the membrane poses a possible risk of separation along the membrane-reinforcing web interface, especially during backwashing operations. Third, the membrane exhibits "sidedness" having a different pore size on one side versus the other side and an exposed scrim reinforcement area. This will limit its utility in certain applications such as analytical, or some diagnostic filtration techniques. Finally, as with the U.S. Pat. No. 4,720,777, the membrane of the U.S. Pat. No. 5,433,859 cannot have another section on the opposite side of the membrane-reinforced web for the same reason as the U.S. Pat. No. 4,770,777.

Thus, there is a need for a relatively thin geometrically symmetrical, continuous, monolithic, reinforced, polymeric microfiltration membrane having at least three independent and distinct pore size performance zones (one reinforced performance zone, presently preferably, central to the membrane structure, and two outer non-reinforced performance zones including at least one outer qualifying performance zone on one side of the central reinforced zone and a second outer non-qualifying prefilter performance zone on the other side of the central performance zone or, two outer qualifying performance zones, one on each side of the central zone) progressing through the thickness of the membrane, each zone being continuously joined throughout the membrane structure. The three zones should be continuously joined by the molecular entanglement which occurs in the liquid state of the dope after the dope of each outer zone is coated onto the dope of the central zone prior to quenching and not by a lamination bond after quenching. Such a three zone membrane structure should be produced by a highly robust, single unit operation, with on-line pore size and layer thickness attribute control. Such a three zone membrane should meet the industries long recognized need for superior performance and greater flexibility of triple layer composite structures. Such a three zone membrane should be relatively inexpensively and easily manufactured. Such a three zone membrane should simplify the production of traditional laminated single layer structure membrane and increase the range of pore sizes and manageable handling thickness that are provided by the non-reinforced zones. Such a three zone membrane should avoid the highly geometrically asymmetric structure of the two zone prior art membrane. Such a three zone membrane should have a geometrically symmetric structure having improved utility, flexibility, and processability into finished industrial forms (pleated cartridges, etc.) while assuring structural integrity. Such a three zone membrane should possess a surprisingly thin cross section, having three independent performance zones in a geometrically symmetrical, continuous, monolithic, reinforced, polymeric, microfiltration membrane. Such a three zone membrane should have a robust mechanical strength, suitable for pleating and industrial handling and capable of being produced on-line and in real time in a surprisingly wide range of pore size attributes, when the apparatus of the present application is coupled with the commonly assigned copending application Ser. No. 09/022,295, filed Feb. 11, 1998, now U.S. Pat. No. 6,056,529, entitled "Methods and Systems For Producing A Plurality of Different Microporous Phase Inversion Membrane Each Having Any One Of A Plurality Of Different Pore Sizes from a Single Master Dope Batch", the disclosure of which is herein incorporated by reference. Such a three zone membrane should have a minimum functional thickness providing maximum throughput at minimal pressure drops, high integrity and be economically produced in a single manufacturing operation.

SUMMARY OF THE INVENTION

An object of the present invention is to provide a three zone, reinforced, continuous, non-laminated, geometrically symmetrical microporous membrane possessing structural integrity.

Another object of the present invention is to provide a three zone, reinforced, continuous, non-laminated symmetrical microporous membrane exhibiting low pressure drop and high flow rate across the membrane.

A further object of the present invention is to provide a three zone, reinforced, continuous, non-laminated, geometrically symmetrical microporous membrane which is particularly suitable for the filtration of biological or parenteral fluids.

Yet a further object of the present invention is to provide a three zone, reinforced, continuous, non-laminated, geometrically symmetrical microporous membrane which is particularly suitable for the filtration of high purity water for the electronics industry.

Yet another object of the present invention is to provide a method for fabricating such a three zone, continuous, reinforced, non-laminated, geometrically symmetrical microporous membrane.

In accordance with these and further objects, one aspect of the present invention includes a three zone microporous membrane comprising: a porous support material substantially impregnated by a first dope to form a middle zone having two sides; and a second zone and a third zone formed from at least one additional dope, each zone having inner and outer surfaces, each of the second and third zones being operatively, continuously, connected to opposite sides of the middle zone, wherein at least one of the three zones has a pore size at least about twenty (20%) percent greater than the pore size of at least one of the other zones.

Another aspect of the present invention includes a three zone reinforced, continuous, geometrically symmetrical microporous membrane comprising: a porous support material; and a continuous microporous membrane having a middle zone disposed between an upper zone and a lower zone, each having an outer surface, wherein the support material is substantially embedded within the middle zone and at least one of the zones has a pore size at least about twenty (20%) percent greater than the pore size of at least one of the other zones.

Another aspect of the present invention includes a three zone microporous membrane prepared by a process comprising: the steps of: providing a continuous support material; at least substantially pressure impregnating the support material with a first dope utilizing a first die means; passing the dope impregnated continuous support material between substantially opposed second and third die means; and substantially, simultaneously coating both sides of the dope impregnated continuous support material with at least one additional dope on each side of the substantially impregnated support material.

Other objects and advantages of the invention will be apparent from the following description, the accompanying drawings and the appended claims.

BRIEF DESCRIPTION OF THE DRAWINGS

FIG. 2 is a schematic representation of the method and apparatus of the present invention;

FIGS. 5a–h are scanning electron photo micrographs of a supported three zone microporous membrane of the present invention illustrating the interface of the three porous zones at 100×, 300×, 500×, 1,000×, and 2,500×.

DETAILED DESCRIPTION OF THE INVENTION

Figure 1:
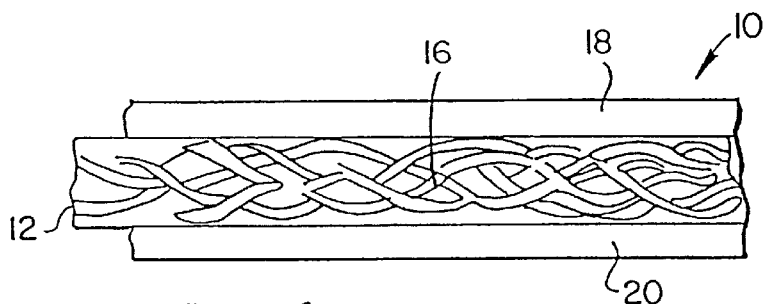
FIG. 1 is a cross-section of the membrane according to the present invention.

As illustrated in FIG. 1, one representative, presently preferred, three zone, reinforced, continuous, non-laminated, geometrically symmetrical, microporous membrane 10 comprises a porous support material or scrim 12 at least substantially encapsulated in a middle or first zone 16, the middle zone being disposed between an upper or second 18 zone and a lower or third zone 20, wherein the support material 12 is at least substantially embedded within the middle zone 16, the middle zone having a pore size at least about twenty (20%) percent greater than the pore size of at least one of the upper zone 18 and the lower zone 20. While this structure for the membrane is presently preferred, it should be understood that the pore size of the middle zone does not always have to be the largest pore size and that any one of the three zones could range from the largest to the smallest possible produceable pore size.

Use of the term "microporous membrane" herein is intended to encompass microporous membranes having the ability to retain particles in the size range of from about 0.01 or smaller to about 10.0 microns and higher.

The term "continuous" as applied to the microporous membrane of this invention shall be understood to refer to a microporous membrane wherein a continuum exists between the three zones constituting the membrane and that no break exists between the polymer structure which comprises the middle zone and that which comprises the upper zone and the lower zone of the membrane. The microporous membrane structure is continuous structure even in the presence of the reinforcing scrim, in that the fiber strains of scrim constitute a network between which the microporous membrane structure is continuous and penetrating. Therefor the scrim and the microporous membrane form continuous interpenetrating networks of their respective polymeric structures.

The term "monolithic" as applied to the microporous membrane of the present invention is intended to mean a single unit.

The phrase "geometric symmetry" utilized herein shall be understood to refer to a structure wherein the upper and lower zones of the microporous membrane possess substantially the same thickness. By "substantially the same thickness," it is meant that the thickness of the upper zone can differ from the thickness of the lower zone, and vice versa, by not more than about twenty-five (25%) percent. It is important to contrast the way the term "symmetry" is employed herein to the way the term "symmetry" is employed in U.S. Pat. No. 4,707,265 where symmetry is used to refer to pore size symmetry; thus, in U.S. Pat. No. 4,707,265 the term applies when the outer qualifying layers possess substantially the same pore size. For certain embodiments of this invention, pore size symmetry is a highly preferred, but not essential, characteristic of the present inventive microporous membrane.

The term "pore size" as used in this present application shall be understood to mean "Mean Flow Pore" as determined by the appropriate ASTM-F316-70 and/or ASTM-F316-70 (Reapproved 1976) tests.

Preferably, the microporous membrane of the present invention is hydrophilic. By the use of the term "hydrophilic" in describing the membrane, it is meant a membrane which adsorbs or absorbs water. Generally, such hydrophilicity is enhanced in the presence of a sufficient amount of hydroxyl (OH—), carboxyl (—COOH), amino (—NH$_2$) and/or similar functional groups on the surface of the membrane. Additionally, hydrophilicity is enhanced by micro textural phenomena as described in Knight, Gryte & Hazlett. Such groups assist in the adsorption and/or absorption of water onto the membrane. Such hydrophilicity is particularly useful in the filtration of aqueous fluids.

Preferred microporous membranes of the present invention are produced from nylon. The term "nylon" is intended to embrace film forming polyamide resins including copolymers and terpolymers which include the recurring amido grouping and blends of different polyamide resins. Preferably, the nylon is a hydrolytically stable nylon possessing at least about 0.9 moles of amino end groups per mole of nylon as described in U.S. Pat. No. 5,458,782, the contents of which are incorporated by reference herein.

While in general the various nylon or polyamide resins are all copolymers of a diamine and a dicarboxylic acid, or homopolymers of a lactam and an amino acid, they vary widely in crystallinity or solid structure, melting point, and other physical properties. Preferred nylons for use in this invention are copolymers of hexamethylene diamine and adipic acid (nylon 66), copolymers of hexmethylene diamine and sebacic acid (nylon 610), homopolymers of polycaprolactam (nylon 6) and copolymers of tetramethylenediamine and adipic acid (nylon 46). These preferred polyamide resins have a ratio of methylene (CH$_2$) to amide (NHCO) groups within the range of about 4:1 to about 8:1. The nylon polymers are available in a wide variety of grades, which vary appreciably with respect to molecular weight, within the range from about 15,000 to about 42,000 (number average molecular weight) and in other characteristics.

The highly preferred species of the units composing the polymer chain is polyhexamethylene adipamide, i.e. nylon 66, having molecular weights above about 30,000. Polymers free of additives are generally preferred, but the addition of antioxidants, surface active agents, charge modifying agents or similar additives may have benefit under some conditions.

The three zone, reinforced, continuous, monolithic, geometrically symmetrical microporous membrane of the present invention has, as an important component thereof, the porous support material 12 at least substantially embedded within the middle zone 16 of the membrane 10 for providing structural strength or reinforcement to the finished three zone membrane. The porous support material 12 may be prepared from any suitable material in any suitable manner. The support material 12 provides the membrane with sufficient strength to withstand the flow pressures encountered during use without deforming to the extent that the microporous membrane 10 is damaged. The support material 12 which can be employed herein woven materials in a grid or mesh-like configuration as well as nonwoven materials formed by extrusion, lamination, and the like. The support material 12 preferably comprises polyester, polypropylene, polyethylene, polyamide and polyvinylidene fluoride, although other web producing polymers may be equally suitable. The support material 12 used in conjunction with the present invention is, presently preferably, formed from fibers of sufficient strength and uniformity, and uniformly dispersed in cross web and machine direction and generally thin for providing a high degree of structural integrity and low pressure drop. For a general discussion of support material attributes, refer to U.S. Pat. No. 4,645,602.

In one presently preferred embodiment, the middle zone 16 of the microporous membrane 10 should have an average pore size which is at least about twenty percent (20%) greater, preferably at least about fifty percent (50%) greater, more preferably at least about 100% greater, and most preferably at least about 200% greater, than the average pore size of at least one of the upper zone 18 and lower zone 20 of the membrane and preferably both the upper and lower zones. The pores formed in the middle zone 16 have an average size of about ten (10) microns or less and the average pore size will preferably range from about 0.5 microns to about two (2) microns, more preferably from about 0.1 to about one (1.0) microns. The middle zone 16 has a pore size distribution which is preferably quite narrow in range, although this is not essential for satisfactory performance.

The middle zone 16 should be as thin as possible so long as it provides sufficient structural strength and embeds the support material 12 such that, presently preferably, no fibers of the support material protrude from the middle zone 16 into either the upper 18 or the lower 20 zone. However, in one preferred embodiment, some strands/fibers of the support material 12 are contiguous with or slightly protrude into at least the one of the other two zone 18, 20 formed from a tight dope or coating solution or into both zones 18, 20 when both zones are formed from a tight dope.

It is believed that having a relatively thin middle zone in which at least some of the scrim is not completely encapsulated within the middle zone may be advantageous in that the thickness of the middle zone will be kept to a minimum, thus, resulting in a thinner overall finished membrane. The thickness of the middle zone will typically range from about fifty (50) microns to about one hundred fifty (150) microns and preferably from about seventy-five (75) microns to about one hundred (100) microns or whatever dope volume is necessary to substantially impregnate the scrim being impregnated at any specific time.

In one presently preferred embodiment, the upper 18 and the lower 20 zones of the microporous membrane 10 possess pores which have a size providing the desired filtration efficiency or particle removal. Generally, the average size of the pores of the upper zone and the lower zone will be about one (1) micron or less, and can typically range from about 0.01 microns to about one (1) microns. More preferably, the average size of the pores of each zone 18, 20 will range from about 0.2 microns to about 0.5 microns. The pore size distribution of the upper 18 and lower 20 zones of the microporous membrane 10 is preferably narrow. In a particularly preferred embodiment, the average pore size of the upper zone 18 is substantially the same as the average pore size of the lower zone 20. By "substantially the same", it is meant that the average pore size of the upper zone does not differ from that of the lower zone, and vice versa, by more than about twenty-five (25%) percent.

One important feature of one preferred embodiment of the three zone, reinforced microporous membrane 10 of the present invention is that the upper 18 and the lower 20 zones have substantially the same thickness so as to provide geometric symmetry around the central axis of the membrane 10. These zones 18, 20 should be as thin as possible in order to minimize the pressure drop across the microporous membrane 10 while being sufficiently thick to yield desired particulate removal. The individual thickness of each of the upper and lower zones will generally range from about twenty-five (25) microns to about one hundred (100) microns, preferably from about thirty-five (35) microns to about sixty (60) microns. The overall thickness of the reinforced, continuous, monolithic, geometrically symmetrical, microporous filtration membrane of the present invention will generally not exceed about ten (10) mils.

The geometric symmetry of the present inventive microporous membrane 10 minimizes mechanical strains, reduces the likelihood of delamination of the membrane and generally improves the structural integrity of the membrane. This is particularly important to fan-fold pleated cartridge arrangements, where both sides of the microporous membrane are expected to bend equally well around the neutral (unyielding) axis of the reinforcing scrim. Such bending should result in an equal distribution of tension and compression forces in the pleat crests and troughs, such that neither side is burdened with an excessive tension or compression load, which would increase the possibility of damage and/or breech failure of the membrane at the pleat area. Furthermore, the unique thin cross-section of the present invention on both sides provides an advantage, in that the tension and compression forces are minimized as the absolute radius from the center of the reinforcement to the outside surface of the membrane is minimized. However, it should be understood that the thickness of one of the upper 18 or the lower 20 zone could be considerably thicker than the other and still be within the teachings of the present application.

The reinforced microporous membrane 10 may be rolled and stored for use under ambient conditions. It will be understood that the three zone, reinforced, microporous membrane of the present invention may be formed into any of the usual commercial forms, such as, for example, discs or pleated cartridges.

For sterile filtration involving biological liquids, the three zone, reinforced, microporous membrane 10 is sanitized or sterilized by autoclaving or hot water flushing. The three zone, reinforced, microporous membrane of the present invention has proven resistant to this type treatment, particularly when a hydrolytically stable nylon is used as described hereinabove, and retains its structural integrity in use under such conditions.

The three zone, reinforced, microporous membrane of the present invention is easy to handle and readily formed into convoluted structures, e.g. pleated configurations. By reason of its improved flow characteristics it may be employed directly in existing installations, without pumping modifications. Specifically, due to the improved flow rate, the existing pumps would actually operate at lower loads and thus would most likely have longer useful lives.

The three zone, reinforced, filtration membrane 10 of the present invention is characterized by unexpectedly high flow rates for a given differential pressure and also characterized by durability, strength, uniformity, lack of pinholes and bubble defects. In many applications, the preferred membranes may be used with either side of the membrane facing upstream.

As illustrated in FIG. 2, one presently preferred method for preparing a three zone, reinforced, continuous, geometrically symmetrical microporous filtration membrane according to the present invention includes: providing a porous support material 12 having first 22 and second 24 sides, presently preferably, pressure impregnating the support material 12 with a first solution or dope 26, coating a second solution or dope 28 over the first side 30 of the pressure impregnated support material 32, coating a third solution or dope 36 over the second side 31 of the pressure impregnated support material 32 such that a continuous microporous membrane having a middle zone 16 disposed between an upper zone 18 and a lower zone 20 (See FIG. 1) formed from the first 26, second 28 and third 36 dopes, the support material 12 being, presently preferably, completely embedded within the middle zone 16 and the middle zone having a pore size at least about twenty percent (20%) greater than the pore size of at least one of the upper zone 18 and the lower zone 20.

The dopes 26, 28, 36, and quench bath 38 utilized in the fabrication of the reinforced microporous membrane 10 herein are conventional in nature. The novel arrangement of slot dies 40, 42, 44 to, presently preferably, first pressure impregnate the support material 12 with a first dope and then to coat both sides thereof with other dopes has been found particularly effective to produce the membrane 10. A schematic representation of one presently preferred apparatus for fabricating the membrane 10 of the present invention is shown in FIG. 2 and includes a first die 40 for pressure impregnating the support material or scrim 12 and substantially opposed second and third dies 42, 44 for substantially simultaneously coating both sides 30, 31 of the initially impregnated scrim 12 or other apparatus capable of coating the membrane as described above.

The three zone microporous membrane 10 of the present invention is generally produced by first pressure impregnating the scrim with a first dope and then coating any one of a plurality of possible dopes containing a film-forming polymer in a solvent system onto each side of the dope impregnated scrim and immediately quenching the dopes 26, 28, 36 in a bath 38 comprised of a conventional nonsolvent system for the polymer. It is presently believed that an important parameter responsible for development of micropores in the membrane (e.g. pore size) is the solvent system employed with the polymer and the nonsolvent system used in quenching the polymer film as well as the phenomena discussed in the previously mentioned patent application. The selection of the solvent for the polymer is determined by the nature of the polymer material used and can be empirically determined on the basis of solubility parameters, as is well known and conventional in the art.

The dopes for forming the preferred nylon microporous membrane of the present invention, presently preferably, contain nylon polymers in a solvent system for the polymer. The solvent system comprises a mixture of at least one solvent and one nonsolvent for the polymer. The solvents which can be used with alcohol soluble nylons include lower alkanols, e.g. methanol, ethanol and butanol, and mixtures thereof. It is known that nonalcohol soluble nylons will dissolve in solvents of acids, for example, formic acid, citric acid, acetic acid, maleic acid, and similar acids.

The nylon dopes after formation are diluted with a nonsolvent for the nylon which is miscible with the nylon solution. Dilution with nonsolvent may be effected up to the point of incipient precipitation of the nylon. The nonsolvents are selected on the basis of the nylon solvent utilized. For example, when water miscible nylon solvents are employed, water can be the nonsolvent. Generally, the nonsolvent can be water, methyl formate, aqueous lower alcohols, such as methanol and ethanol, polyols such as glycerol, glycols, polyglycols, and ethers and esters thereof and mixtures of any of the foregoing.

The support material 12 having first 22 and second 24 sides may be impregnated with the first dope 26 by any of a variety of techniques, e.g., roll coating, spray coating, slot die coating, and the like, with slot die pressure impregnating being presently preferred, to substantially completely impregnate the support material 12 with the first dope 26. As used in this disclosure, "complete impregnation of the support material" means that all fibers of the support material are completely surrounded by liquid dope and that no portion of the support material is not covered by liquid dope and that no portion of the support material protrudes from the center zone into either the second or third zones in the finished three zone membrane.

The support material 12 is preferably maintained under tension, in a manner known in the art, while the first dope 26, under pressure, penetrates and saturates the support material 12. The impregnated support 32 can be calendered, if desired, by rollers to force the first coating solution into the support as described in U.S. Pat. No. 4,707,265, the contents of which are incorporated by reference herein. Thereafter, the second dope 28 is coated over the first side 30 of the impregnated support material 32 and the third dope 36 is coated over the second side 31 of the impregnated support material employing the substantially opposed slot dies or any other suitable technique which provides for the essentially simultaneous coating of a second dope on one side of the dope impregnated scrim and a third dope on the second side of the dope impregnated scrim. Application of the second 28 and third dopes 36 is, presently preferably, simultaneous or substantially simultaneous using substantially opposed slot dies 42, 44 such that the impregnated solution 32 is supported by the mutual hydrodynamic forces of the substantially opposed slot dies 42, 44. Slot dies 42, 44 to which the dopes 28, 36 are fed under pressure have been found to provide particularly good results in applying the second 28 and third 36 dopes to the sides of the dope impregnated support member 12. Preferably, the slot dies 42, 44 are disposed essentially directly opposite one another (See FIG. 2) with the dope impregnated support 32 passing therebetween. The second 28 and third 36 dopes are coated over each side 30, 31 in, presently preferably, substantially equal amounts but are not required to be coated with equal amounts of dope.

In accordance with one preferred embodiment, the second 28 and third 36 dopes produce substantially identical pore sizes but produce a different pore size from the first dope 26. In accordance with another preferred embodiment, the second 28 and third 36 dopes produce a different pore size as well as each producing a different pore size from the first dope 28. It is possible to have any pore size from the largest to the smallest in any of the three zones and in any order.

Thereafter, the first 26, second 28 and third 36 dopes are simultaneously quenched with the outer surfaces of the second and third dopes having direct contact with the quenching fluid in the same quench bath 38. Since the first 26 dope is, presently preferably, more coarse, it will coagulate more slowly, provide for the formation of a three zone, continuous, monolithic, symmetrical, geometrical, microporous membrane 10 having a relatively open-pore middle zone 16 (See FIG. 1) disposed between tighter pore sized upper zone 18 and lower zone 20 or a relatively open-pore sized upper or lower zone and a tighter pore sized upper or lower zone. After the microporous membrane is formed, the membrane is washed and dried to provide the final product, shown in FIG. 1.

It has been determined that the shape of the nose of the first die 40 used to pressure impregnate the scrim 12 is important to accomplishing substantially complete and, presently preferably, complete impregnation or saturation of the scrim 12. Specifically, in order to obtain a complete or a substantially complete impregnation of the scrim 12, the relative position of the scrim on the nose of the die 40 should be approximately as depicted in FIG. 2, except that the upper die surface contacting the scrim should be arched instead of being straight, as shown. Specifically, it is believed that the upper portion of the die 40 should be, presently preferably, arched with the angle that the scrim 12 forms with the die should be between about five (5°) degrees and about sixty five (65°) degrees. Since it is important for one aspect of the invention that the first dope 26 substantially completely impregnate the scrim 12, this relative position of the scrim to the upper surface of the die 40 has been determined as important to ensure that not only is the scrim completely or substantially completely impregnated and saturated with the first dope but also that, presently preferably, a sufficient amount of liquid dope extends beyond the fibers of the scrim 12 so that all fibers are covered by, presently preferred, at least about one (1) mil of liquid dope prior to the scrim, impregnated with the first liquid dope, having the second and third coating dopes coated substantially simultaneously thereon.

Further, since it is important to prevent or at least minimize vapors from the quench bath from contacting the dopes after the scrim has been impregnated and coated on both sides with the dope, means, such as, for example, a controlled vapor zone, are provided for preventing or at least minimizing the quench bath vapors from interacting with the coated scrim before quench. This controlled vapor zone is needed to prevent dope from solidifying on the bottom of the dies and to prevent quenching of the dope from contact with the vapors before the dope reaches the quench bath, as is known in the art.

However, it is also important in another aspect of the invention to pressure impregnate a predetermined amount of the first dope into the scrim such that at least one portion of the scrim is not completely covered by the liquid dope. In such cases, at least one fiber or portion of a fiber of the scrim be at least contiguous with or slightly protrude into the second dope zone and/or the third dope zone. When producing a three zone membrane having the same pore size zones on both sides of the center zone, both sides of the dope impregnated scrim have at least portions that are at least contiguous with or protrude above the liquid dope surface after the scrim has been impregnated thereby. Such incomplete encapsulation of the scrim by the first dope results in finished three zone membrane having portions/fibers of the scrim that protrude or are contacted by both the second and third zones or only one of the zones, the zone having the tighter pore size.

When producing a three zone membrane having three different pore size dopes, it is presently preferred that the side of the pressure impregnated scrim that is coated by the tight dope have at least one portion of the scrim extending above the level of the dope impregnating the scrim, breaking the surface tension of the liquid dope substantially impregnating the scrim after the scrim has been pressure impregnated and before being coated by the tight dope.

The described method can be conducted in a continuous or batch-wise manner in a number of representative apparatus. In general, the support material 12, e.g., in the form of a nonwoven fibrous scrim, is unwound under tension from a roll and pressure impregnated with the first dope 26 as described above. The pressure impregnated support material 12 is then coated on each side 30, 31 with second and third dopes as previously described. The unquenched dope/scrim combination is then substantially immediately immersed while still under tension in a quench bath to form the three zone, continuous, microporous membrane of the present invention from the first, second and/or third dopes. The microporous membrane is then dried and wound under tension on a roll for storage, as is known in the art.

It is believed that impregnation of the scrim is a function of the viscosity of the dope, the back tension on the scrim, the gap in the initial die which effects the dope pressure and the velocity of the scrim relative to the dope. Each of these parameters is unique to the specific scrim being impregnated by the dope and can be determined by those skilled in the art.

As an example, as would be appreciated by those skilled in the art, if the viscosity of the first dope is too low, the first dope will lack cohesiveness and the ability to be readily coated by the second and/or third dopes. If too viscous, the first dope will not completely, properly, impregnate the scrim which will cause an excess of the first dope to remain on the die side of the scrim and not properly penetrate to the far said of the scrim.

As illustrated in FIG. 2, one representative apparatus 50 useful in the production of the membrane of the present invention includes a conventional assembly 52, for providing the continuous scrim or other support structure 12 for receiving the polymer dopes 26, 28, 36. The conventional assembly typically includes an unwind station comprising a let-off apparatus which includes a spindle for mounting one or more rolls of support material and related release and brake elements conventionally employed for paying out a continuous sheet of the support material, as is known in the art. The assembly 52 also includes a plurality of conventional unwind rollers which begin to orient movement of the scrim through a ladder unit which conventionally includes a series of rollers which further align and begin to tension the scrim 12 and prepare the scrim for the impregnation operation, as is known in the art.

After the scrim 12 leaves the conventional ladder unit, the scrim enters a conventional drive section. The drive section includes a plurality of individual rollers, at least one of which is driven to pull the scrim 12 from the conventional unwind station. Additionally rollers are provided and arranged to regulate the tension in the scrim 12 and the position of the scrim 12, as is known to those skilled in the art.

The scrim 12 is fed by the conventional drive section, downwardly between, presently preferably, a series of dies, including the first die 40 for, presently preferably, completely pressure impregnating the scrim with a first dope 26 and second 42 and third 44 dies for coating a second 28 and a third 36 dope on to the outer surfaces of the dope impregnated scrim. In the preferred embodiment of one apparatus useful to produce the present invention, the first die 40 is a single slot die, operatively connected to a suitable reservoir 60 containing the first dope 26. The first dope may vary depending on the type of film-forming polymer used, but is generally a liquid dope formulated and treated to produce a specific pore size when quenched. A conventional controlled pumping mechanism (not shown) operates to selectively deliver the first dope 26 from the reservoir 60 to the first die 40. The first die 40 has an opening configured to provide an even amount of the first dope 26 so as to pressure impregnate the scrim 12 as the scrim 12 passes by the opening of the first die 40. When different sizes of scrim 12 are used, the die 40 may be changed for appropriate scrim impregnation. It is important that the dope 26 transferred to the scrim 12 substantially completely saturate or impregnate the scrim, as was discussed above.

After the scrim 12 is at least substantially impregnated or saturated with the first dope, the scrim travels between the second 40 and third 44 dies. In one embodiment of the apparatus, the scrim 12 is disposed vertically and travels in the downward direction. In one presently preferred embodiment of the apparatus, the scrim 12 may initially travel at an angle less than vertical, as shown in FIG. 2. Second 40 and third 44 dies are essentially disposed on opposite sides of the scrim 12 in order to produce the membrane of the present invention. Second die 42 is directed to coat the polymer dope 28 desired onto the first surface 22 of the substantially saturated scrim 12 and in like manner, third die 44 is directed to coat the polymer dope 36 desired onto the second surface 24 of the substantially saturated scrim 12. Each die 42, 44, is fed from a reservoirs 62, 64 having the dopes 28, 36. The dopes comprise, for example, nylon 66 dissolved in formic acid where the desired polymer membranes are nylon and identical. It is to be appreciated that the dopes may be a combination of any of the well-known film-forming polymers in an appropriate well-known solvent. Conventionally controlled pumping mechanisms (not shown) selectively deliver the dope 28, 36 to the dies 42, 44.

Figure 3:
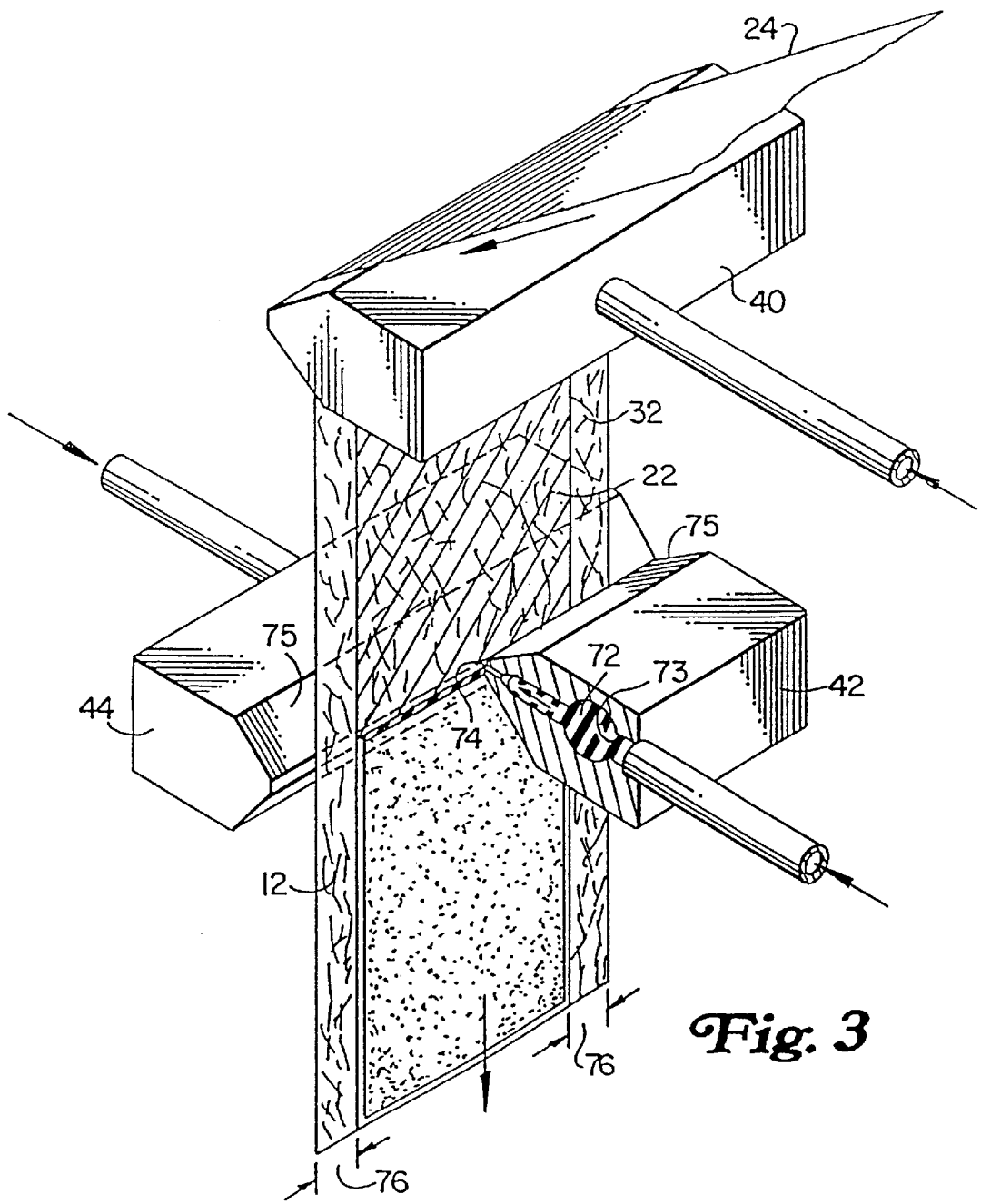
FIG. 3 is an enlarged perspective view of a web positioned between the opposed dies of FIG. 2, with a portion of one die partially broken away.
Figure 4A:
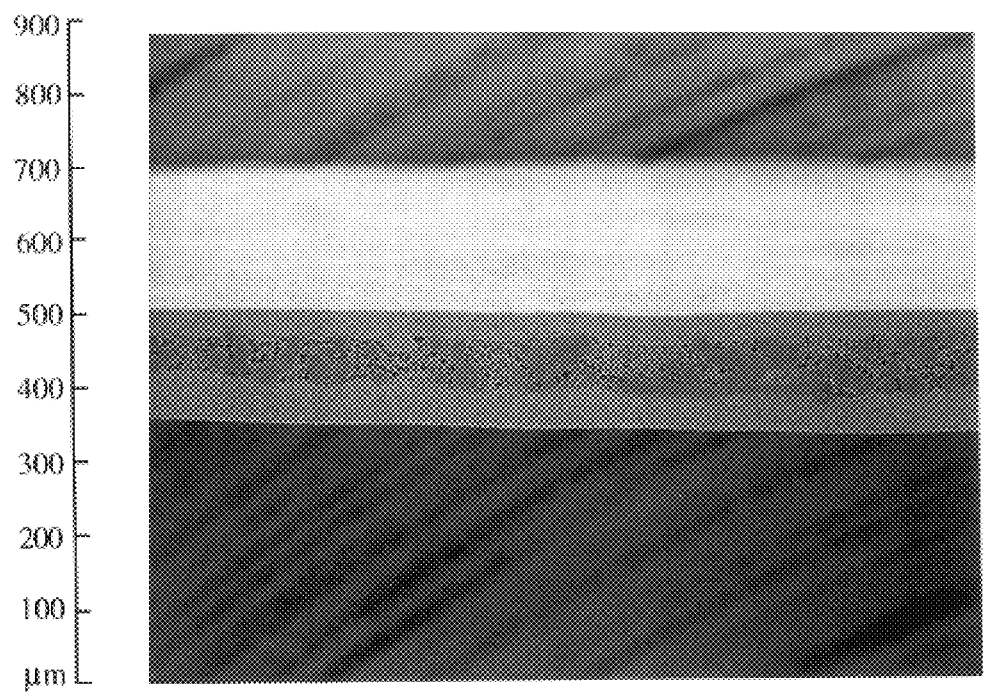
FIGS. 4a–h are scanning electron photo micrographs of a supported three zone microporous membrane of the present invention illustrating the interface of the three porous zones at 100×, 300×, 500×, 1,000×, and 2,500×.
Figure 4B:
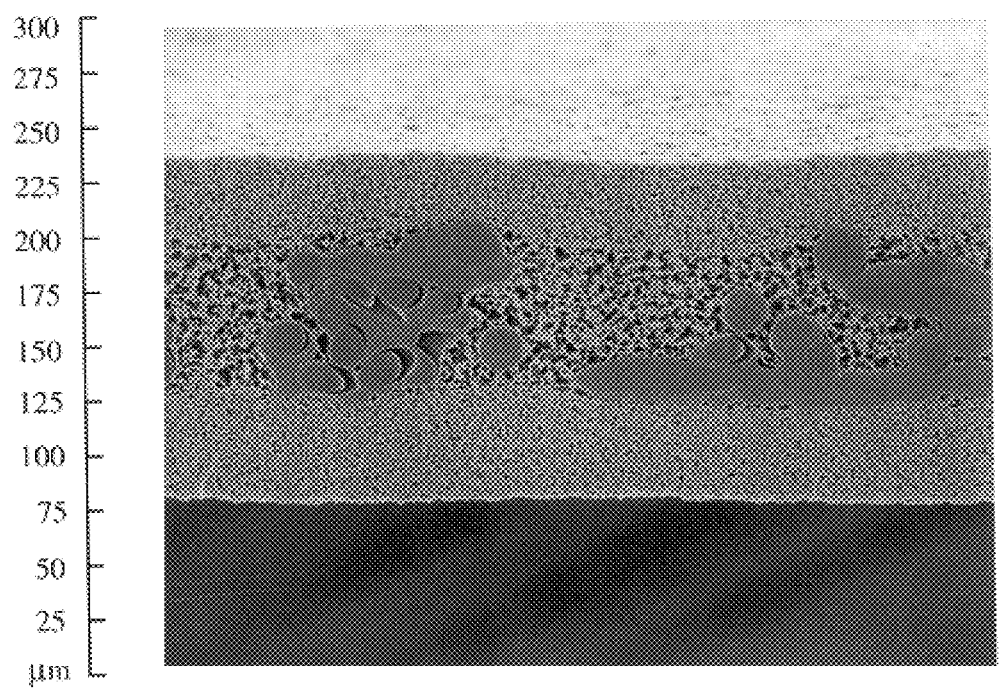
Figure 4C:
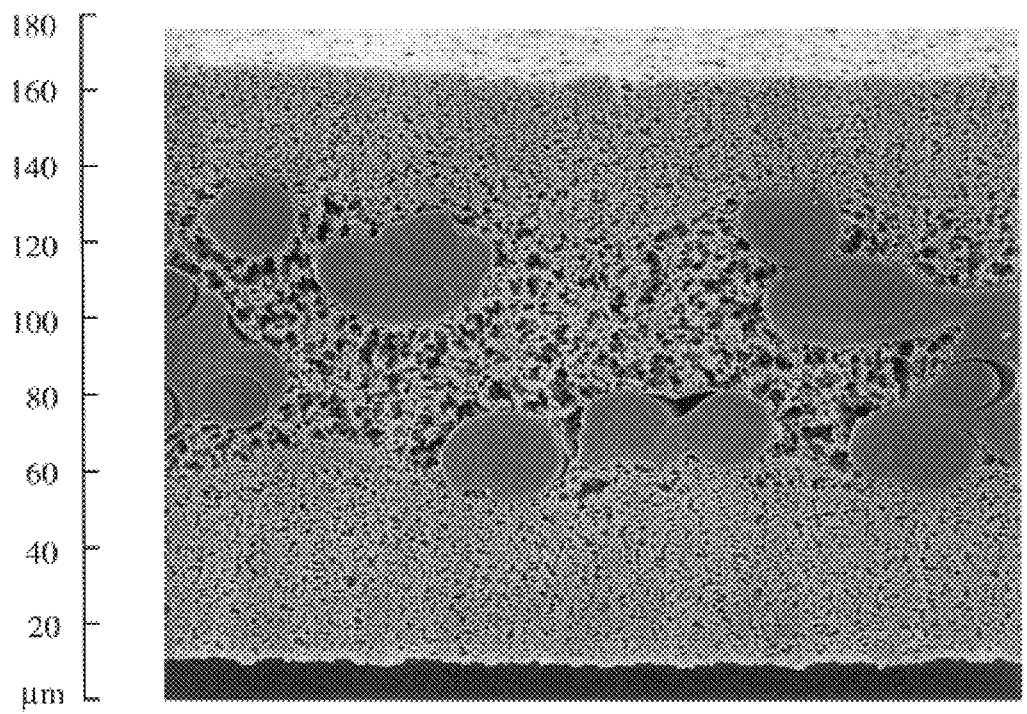
Figure 4D:
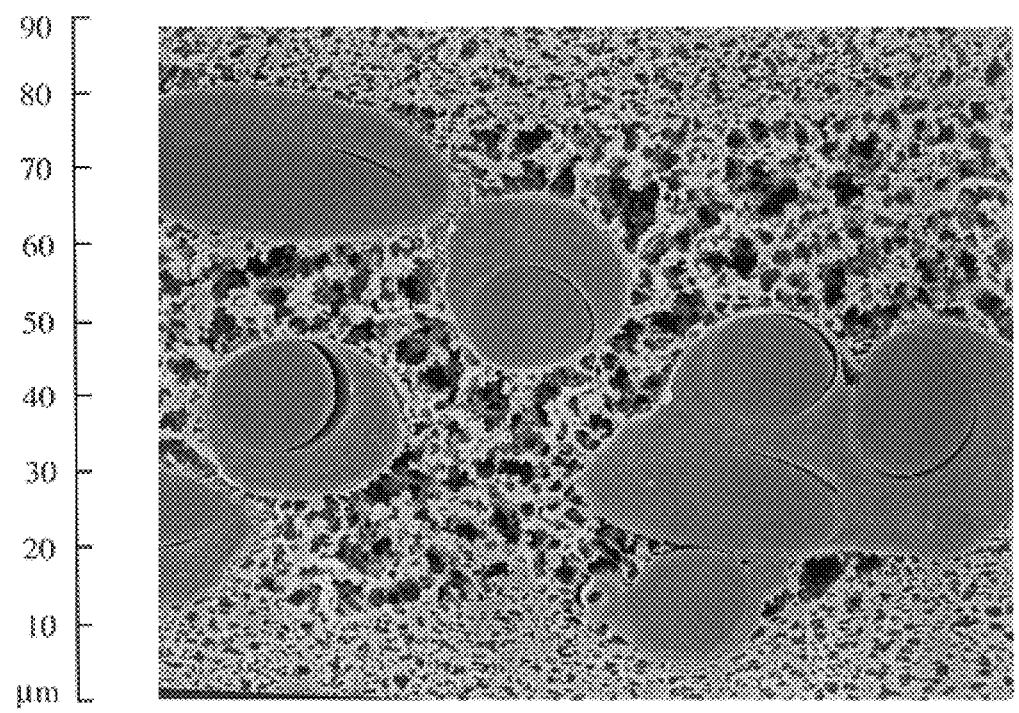
Figure 4E:
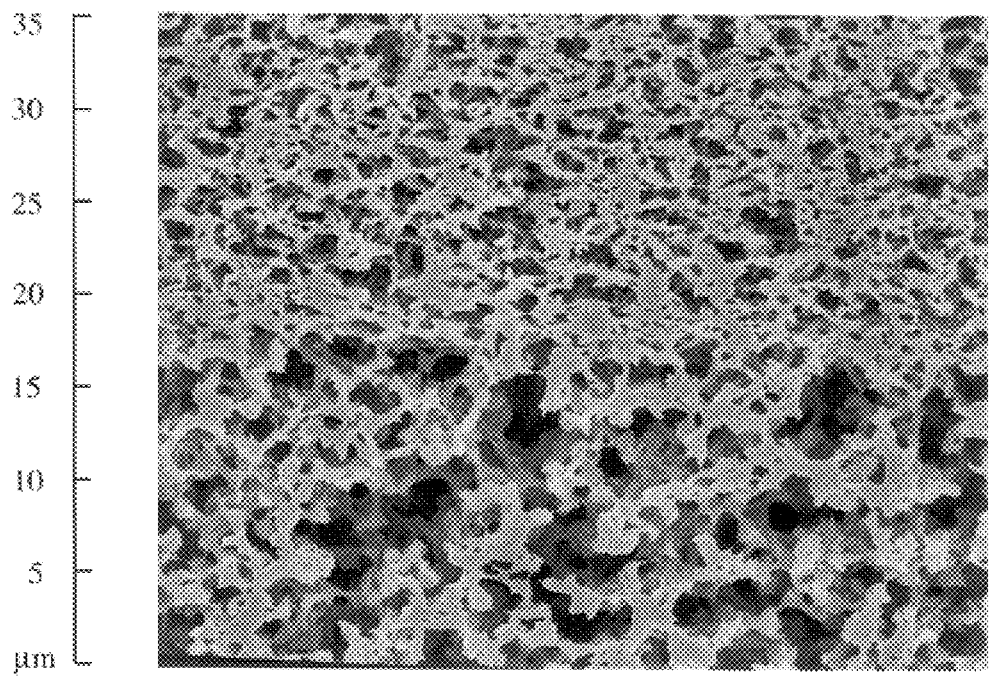
Figure 4F:
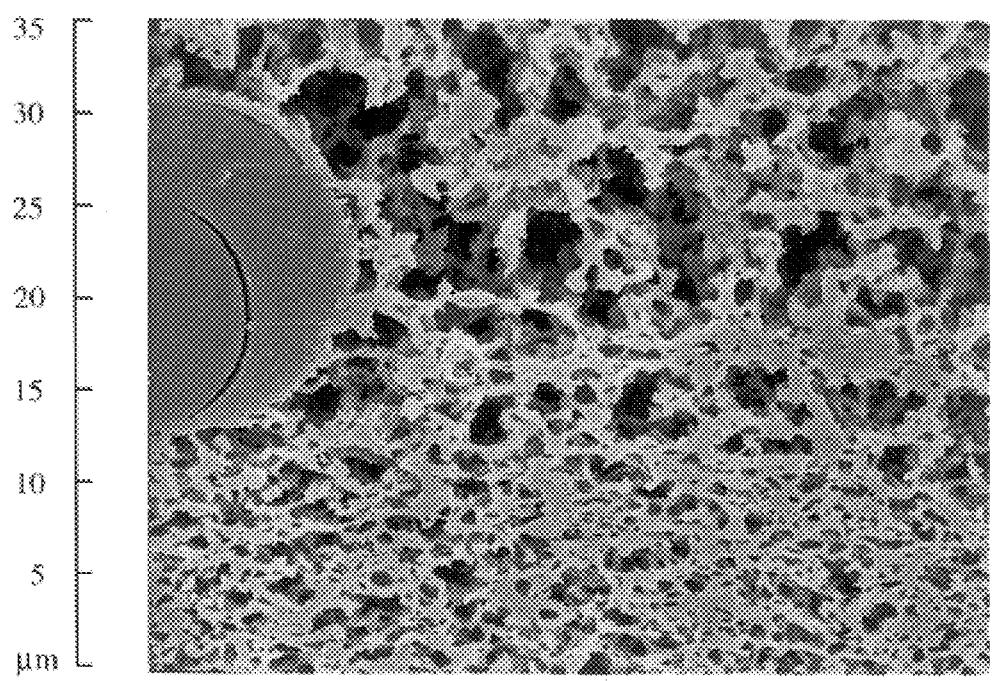
Figure 4G:
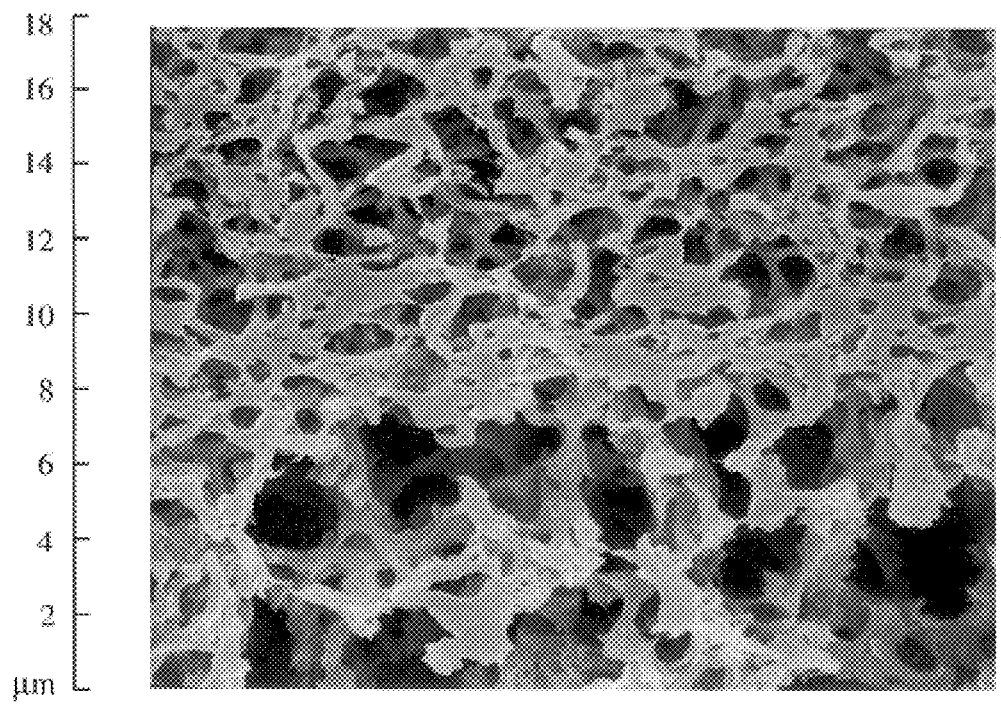
Figure 4H:
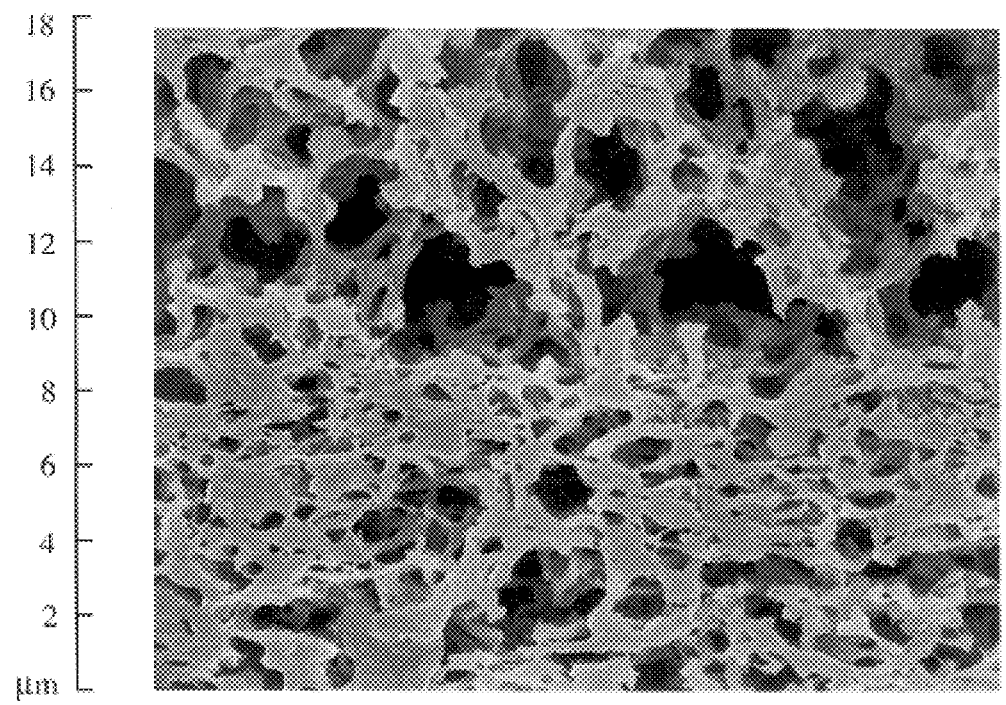
Figure 5C:
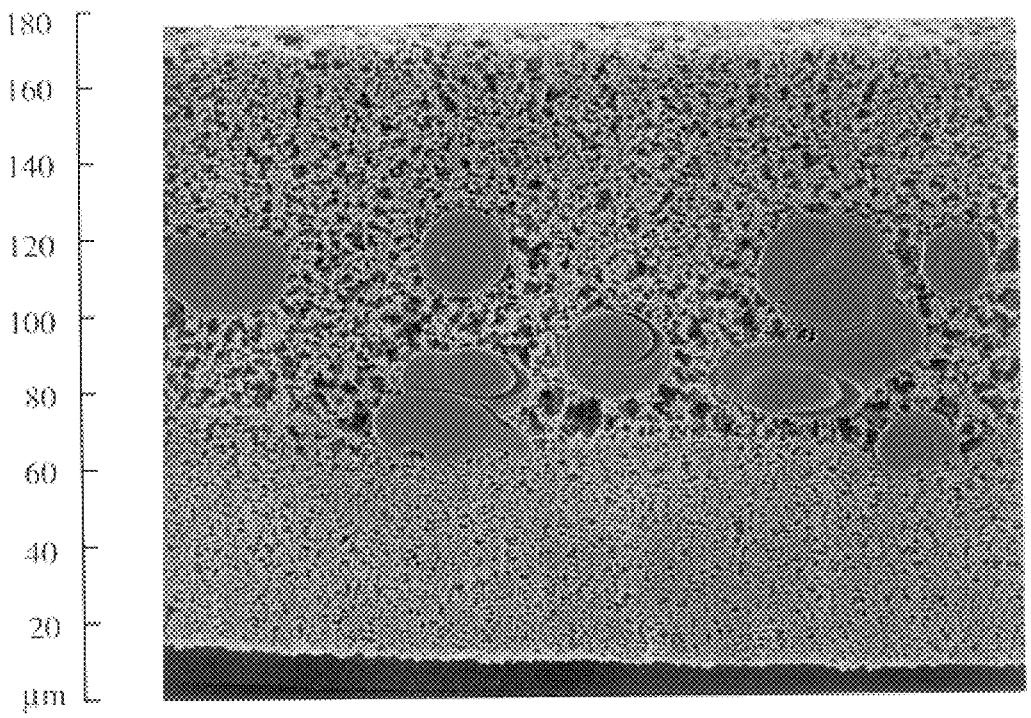
Figure 5D:
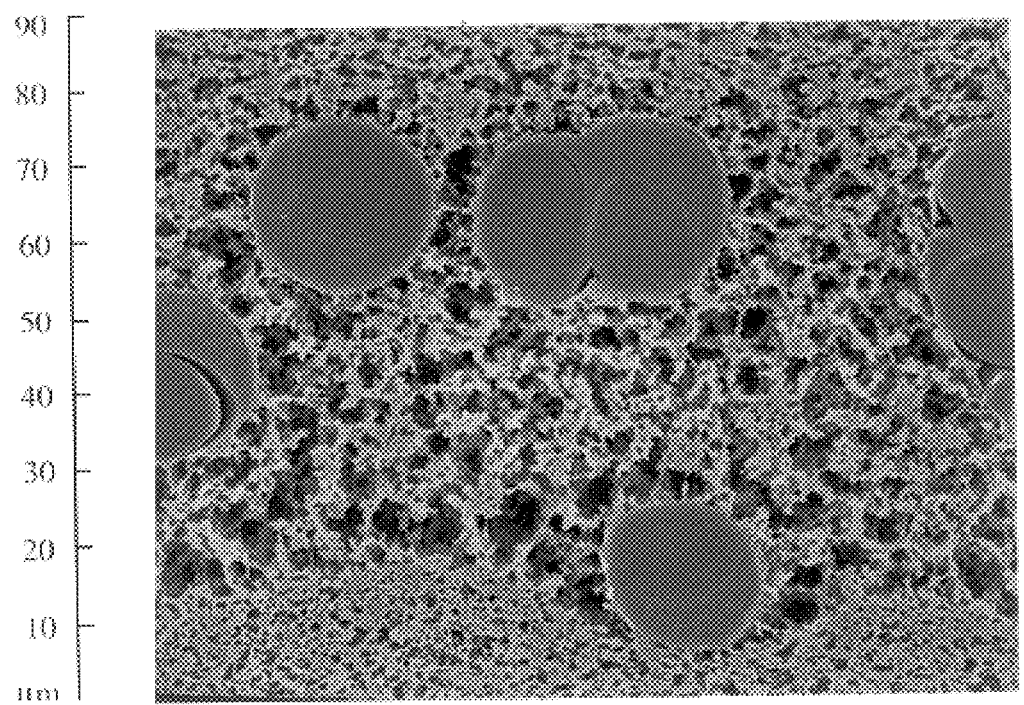
Figure 5E:
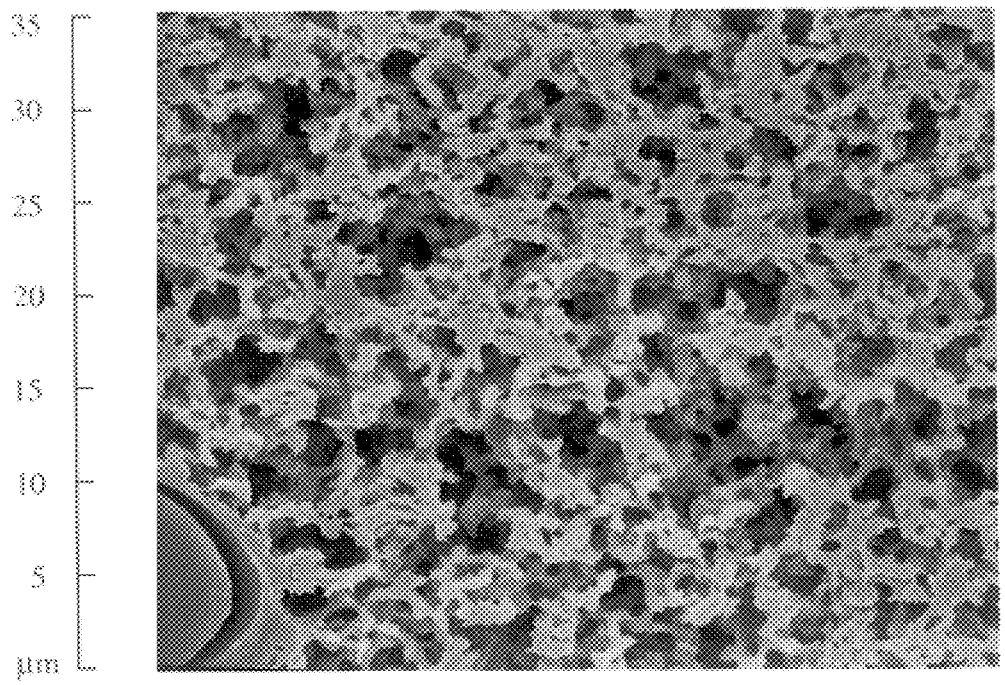
Figure 5F:
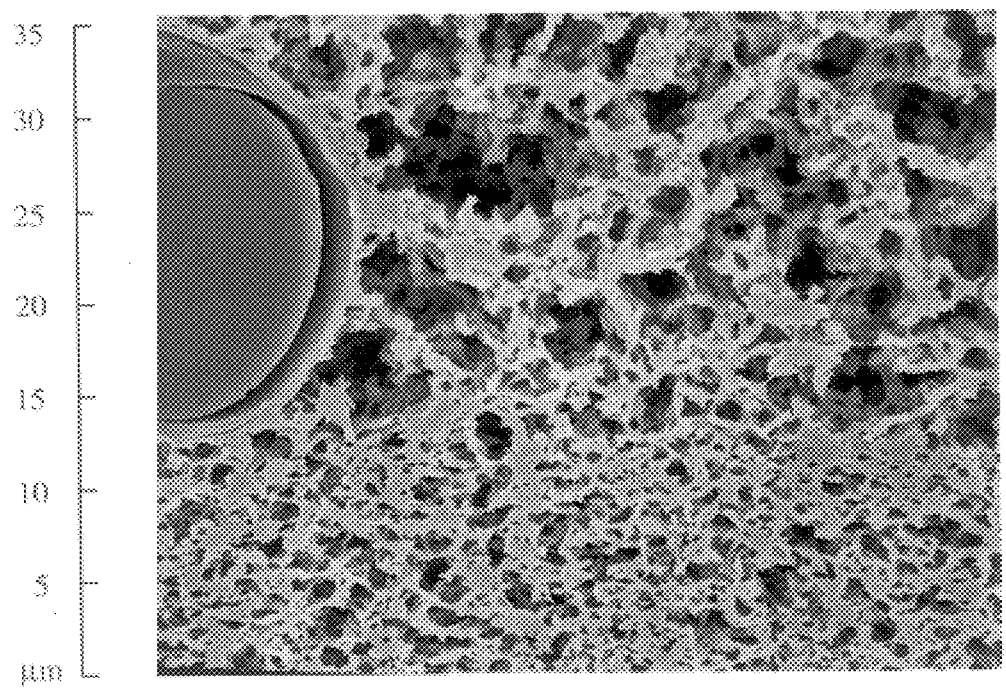
Figure 5G:
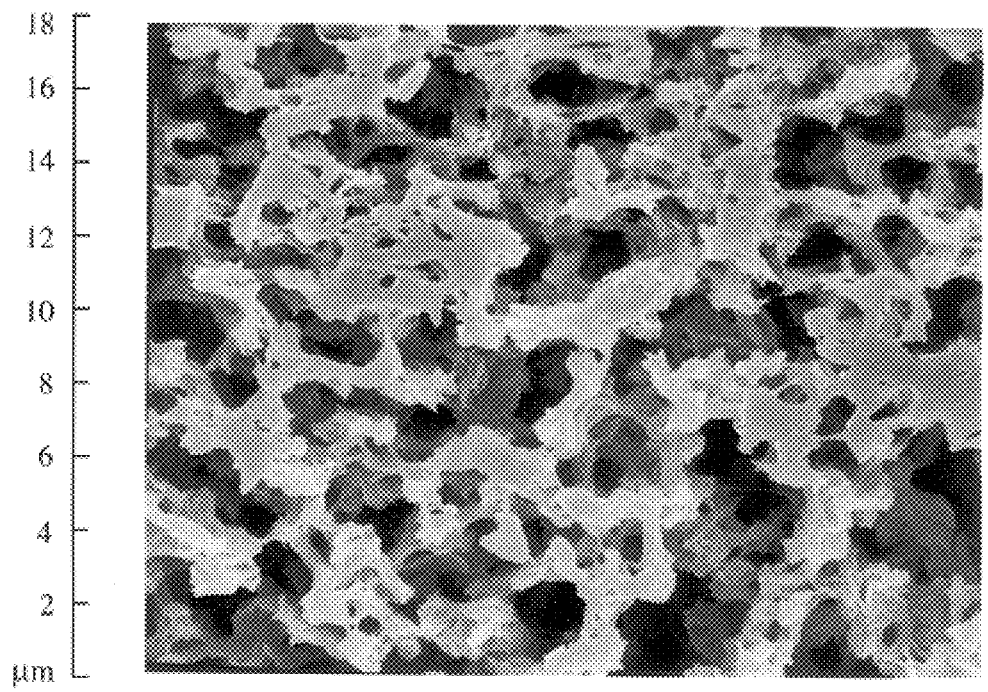
Figure 5H:
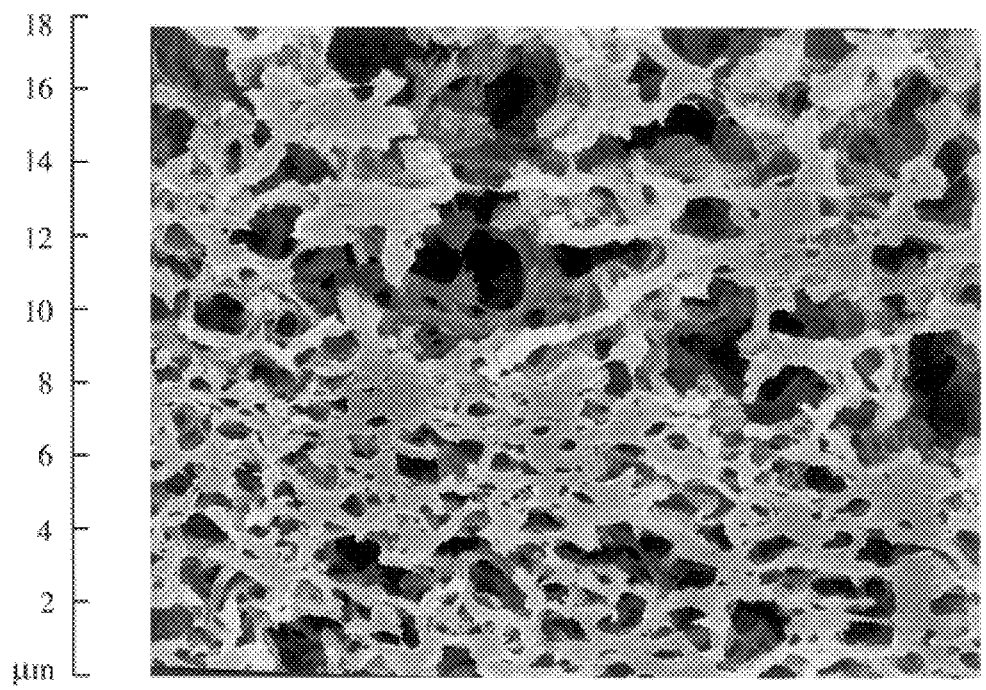

As best shown in FIG. 3, the dies 42 44 are each disposed on opposite sides of the pressure impregnated scrim 12 and essentially opposed to the other die. Each die 42, 44 has a chamber 72 for receiving the dope solution and a narrow slot 74, transversely extending across each side of the front 75 of each die, for transferring the dope solution onto the impregnated scrim 12 (die 40) and then to coat the substantially saturated scrim on both sides (dies 42, 44). The dope is forced out of the slots 74 by the pressure supplied by the conventional reservoir pumps (not shown), in a manner known in the art. The pressure provided to the dope varies with each dope and scrim used. Determination of the appropriate pressure for any of the dopes applied to a particular scrim is known to those skilled in the art. The dies 42, 44 are positioned close enough to the substantially saturated, impregnated scrim 12 so that the dope directly contacts the outer surface 22 of the dope saturated scrim 12 when the dope is forced from the slot 74. As is apparent in FIG. 3, the length of the slot 74 determines the final width of the dope coated onto the saturated scrim. By masking or other appropriate means, it is possible to foreclose coating the dope at the edges of scrim 12, leaving a selvage area 76 for trimming, potting or other post-formation operations. It is to be understood that the initial dope is different from the other dope(s) and that it is possible to have three different dopes, with a first dope impregnating the scrim 12 and the second and third dopes coated on each side of the first dope impregnated scrim, resulting in a graded density three zone membrane.

In similar fashion, although not shown, intermediate areas along the slots 74 can also be masked to accommodate the ultimate filtration purposes and apparatus in which the reinforced, continuous membrane of the present invention is to be employed. The internal configuration of the first die 40 is similar and therefore has not been disclosed in greater detail. However, it is believed important that the first die 40 be positioned so that the initial dope substantially, completely saturates the scrim 12, as will be appreciated by those skilled in the art.

As shown in FIG. 2, after all three dopes have been applied to the scrim 12, the resulting unquenched scrim reinforced structure is directed into the quenching unit 38. Quenching unit 38 is conventional and includes a conventional reservoir for circulating a quantity of nonsolvent, hereinafter referred to as the quench bath, for the dissolved polymer which forces the polymer in each of the three dope zones to solidify. The result of the quench is a continuous, non-laminated, geometrically symmetric, reinforced, membrane 10 comprising a zone of microporous polymer 18, 20 on each side of a middle zone 16 of microporous polymer encapsulating a support material 12 (See FIG. 1). After the polymers have solidified in the quench, the membrane 10 passes over a conventional first roller that is immersed in the quench bath. The membrane 10 is then conventionally drawn through the quench bath and around a second roll which is driven by conventional drive means (not shown). At this time, formation of the composite membrane 10 is complete, but excess liquid from the quench bath 38 remains thereon. The resulting three zone membrane 10 is geometrically symmetric because the layers 18, 20 of polymer were substantially equally coated and quenched before contacting any rollers or other devices that might interfere with the solidification of the dope polymers during quenching.

As shown in FIG. 2, the scrim 12 having three distinct layers of dope operatively applied thereto is directly immersed in the quench bath 38. For the purpose of this disclosure, the term directly is intended to mean that the impregnated, coated scrim does not contact or interact with any rollers or other solid elements of the apparatus 50 between the dies 40, 42, 44 and the quench bath 38. Thus, directly is not intended to refer to the length of time that the impregnated, coated scrim takes to travel from the coating dies 42, 44 to the quench bath and is not intended to refer to the physical distance between the coating dies 42, 44 and the quench bath 38. However, it is preferred that the distance and the time be as short as possible consistent with the production of high quality membrane. Further, since it is important to prevent or at least minimize vapors from the quench bath from contacting the dopes after the scrim has been impregnated and coated on both sides with the dope, means, such as, for example, a controlled vapor zone, are provided for preventing or at least minimizing the quench bath vapors from interacting with the coated scrim before quench. This controlled vapor zone is needed to prevent dope from solidifying on the bottom of the dies and to prevent quenching of the dope from contact with the vapors before the dope reaches the quench bath, as is known in the art.

The newly formed membrane 10 is presently preferably, immediately rinsed of excess fluid from the quench in a conventional first stage rinsing unit 70, as is known in the art. The membrane is thereafter, directed over another plurality of rollers and into a counter-current flow wash tank 72, including a reservoir containing a quantity of water, a plurality of rollers to increase the contact time of the membrane 10 within the tank 72, and suitable spraying and circulation apparatus, as known in the art to complete the rinse of the membrane 10, as is known in the art. After the membrane 10 leaves the wash tank 72, it enters a conventional winding section 74 where the membrane 10 is wound onto a spindle or the like for storage and drying, as is known in the art.

As should be apparent from the drawings and the previous description, the dies 42, 44 are disposed in opposed fashion to coat, presently preferably, simultaneously, both surfaces of the substantially saturated scrim which, in turn, is passing vertically therebetween. The substantially saturated scrim coated on both sides by dope emanating from the dies is then caused to pass a predetermined distance, toward the quenching unit downwardly where the impregnated, coated scrim is contacted only by air. The distance can be controlled somewhat by movement of the dies 40, 42, 44 and more readily by lowering or raising the level of the quench liquid in the tank. Control over this distance may effect formation of the microporous membrane by controlling the vapor zone.

Once having traversed the distance to the quench tank, the impregnated, coated scrim is then immersed in the quench fluid contained therein. The coated scrim is then caused to pass a predetermined distance, within the quenching unit, before reaching a first roller, as is known in the art.

An important aspect of the method for producing the product of the present invention is that the impregnated, coated scrim does not encounter any rollers or other solid or physical elements of the apparatus at this stage, which is prior to solidification of the three zones of dope to an extent that the membrane develops sufficient integrity to avoid and resist deformation encountered during subsequent steps of the manufacturing process. Accordingly, the first predetermined distance and the second predetermined distance function together to provide means for permitting the polymer membranes to solidify on the impregnated, coated scrim sufficiently to avoid and resist damaging deformation during subsequent manufacture of the composite membrane. This ensures that the membrane zones, 18, 20 are substantially uniform in thickness and provide the pore structure and size desired and intended by selection of the dope(s) and quench solutions and other parameters including temperature, concentrations, rate of the impregnated, coated scrim through the apparatus and the like.

Generally, the residence time the impregnated, coated scrim travels within the quench tank 38 is related to speed of travel of the impregnated, coated scrim, temperature and concentration of the quench fluid and the height of the tank Accordingly, at the bottom of the tank 38, a roller, as is known in the art, is provided to reverse the travel direction of the coated scrim, upwardly and out of the tank.

Upon exiting the tank 38 the quenched membrane is subjected to washing for the purpose of removing the excess quench liquids. The apparatus provides first state rinsing unit 70 and a counter-current flow wash tank 72, as described hereinabove. Thereafter, the membrane structure is wound and/or dried for subsequent usage, as is known in the art.

EXAMPLES

Preparation of the dopes:

Two dopes were prepared using the methods described in U.S. Pat. No. 4,707,265, Example 1. The dopes were produced using a 14.5 percent by weight Nylon 66 (Monsanto/Solutia Vydyne® 66B) polymer. The characteristics of the prepared dopes processed as standard dry double layer non-reinforced membrane are given in Table I.

TABLE I

Dopes for Examples 1, 2, and 3

| Dope I.D. | Dope Type | % Solids | Viscosity, (cp) | IBP (psig) | FAOP (psig) | Thickness (mils) | Q (cc/min) | M.F.P. (micron) |
|---|---|---|---|---|---|---|---|---|
| 97L028 | "A" = Smaller Pore | 14.5 | ~3000 | 43.5 | 49.8 | 7.0 | 69.1 | 0.426 |
| 97L038 | "B" = Larger Pore | 14.5 | ~3000 | 19.7 | 21.6 | 9.1 | 259.2 | 1.006 |

Example 1

A geometrically symmetric and pore size symmetric reinforced three zone membrane, with an "open" (large pore size) scrim impregnation was prepared as follows.

A non-woven Polypropylene bicomponent fiber web or scrim suitable for preparation of the present invention (commercially available from Freudenberg under the tradename Viledon®, Grade # F02432), having a basis weight of nominally 30 gm/sq.meter was processed by the method taught in the present application. The scrim was pre-treated with a mild Corona Discharge to enhance it's wetabiliy prior to being pressure impregnated. The larger pore size dope, 97L038, was used to pressure impregnate the web, with an impregnation weight of about seven (7) gm/sq.meter of Nylon solids. The nylon solids were provided from the dissolved nylon in the dope solution, which was, for this example, a fourteen and one half (14.5) wt % nylon solution (approximately 50 grams of liquid dope per square meter), which was sufficient to impregnate and fill the void volume of the scrim, creating the first zone of large pore size dope integral with the supporting scrim. Almost immediately following the pressure impregnation of the scrim with the 97L038 dope, both sides of the pressure impregnated scrim were essentially simultaneously coated with substantially even layers of the small pore size dope, 97L028. In this example, the total coating weight delivered to the two sides was about thirty seven (37) gm/sq.meter of Nylon solids in about a fourteen and one half (14.5) wt % solution (approximately 260 grams of liquid dope per square meter), with the total being split into two streams of dope feeding onto the two sides, so that both sides were substantially evenly coated with the same dope, creating the second and third zones of small pore size dope. The split in the amount of the 97L028 dope was not perfect, in that one side of the impregnated scrim received approximately fifteen (1 5) gm/sq.meter of Nylon solids (Zone two), where the other side received approximately twenty two (22) gm/sq.meter of Nylon solids (Zone three). The imbalance in the amount of dope coated on the two sides resulted in a slight imbalance in the small pore size qualifying zone coating, but the imbalance was not detrimental to the performance of the finished product. The grand total application of both dopes (large and small pore size) was, thus, approximately forty four (44) gm/sq.meter Nylon solids. The thus coated three zone structure was then quickly brought into contact with a Marinacco-style quench solution, which simultaneously quenched the three zone structure from the outer surfaces of the small pore size dope, 97L028, such that a continuous microporous membrane structure was formed. The quenched membrane was then washed, dried under X & Y direction dimensional restraint, and tested, in the usual manner. The test results are shown in Table II.

FIGS. 4a–4f are Scanning Electron Photo Micrographs of a cross-section of the membrane produced in Example 1.

Example 2

A geometrically symmetric and pore size asymmetric three zone membrane was prepared as follows.

A second three zone membrane was prepared in nearly identical manner as in Example 1, with the exception that one of the coating sides of the pressure impregnated scrim (in this case, Zone two) was coated with the same approximately fifteen (15) gm/sq.meter Nylon solids from the large pore size dope 97L038. The opposite side (Zone three) was coated with the approximately twenty two (22) gm/sq.meter Nylon solids from small pore size Dope 97L028. After two-side simultaneous quenching, washing and restrained drying, the resultant finished membrane had achieved a continuous, substantially geometric symmetry around the neutral axis of the reinforcing scrim, but had very different pore size attributes on both sides of the scrim. (i.e., Pore Size Asymmetric.) The test results for this membrane are also shown in Table II.

FIGS. 5a–5f are Scanning Electron Photo Micrographs of a cross-section of the membrane produced in Example 2.

Example 3

A Control, Reinforced Membrane (single dope, three zones) was prepared.

A control reinforced membrane was produced for comparison with the reinforced membrane produced according to the method of the present application. This three zone, reinforced, membrane was identical to the membrane produced in Example 1, except that the pressure impregnated first zone was also produced using the small pore size dope 97L028. Thus, all three zones were produced using a single dope, split into three streams to each of the dies. After two-side simultaneous quenching, washing and restrained drying, the resultant finished membrane was a continuous, substantially geometrically symmetric, single pore size structured membrane; which was similar in appearance and function to any standard single layer reinforced membrane which is common to the Nylon microporous membrane industry today. The test results for this membrane are also shown in Table II.

TABLE II

Membrane Test Attributes from Examples 1, 2, and 3

| Example # | Dope Type in Zone "3-1-2" | Roll I.D. # | IBP (psig) | FAOP (psig) | Thickness (mils) | Q (cc/min) | M.F.P. (micron) |
|---|---|---|---|---|---|---|---|
| 1 | "A-B-A" | 97L028-05 | 44.2 | 54.7 | 7.1 | 97 | 0.430 |
| 2 | "A-B-B" | 97L028-03 | 41.3 | 47.9 | 7.3 | 145.1 | 0.562 |
| 3 (Control) | "A-A-A" | 97L028-01 | 41.8 | 49.7 | 6.9 | 81.4 | 0.489 |

Discussion of Examples 1 through 3

As can be seen from Table II, the Example 1 membrane has a clearly improved flow rate over the standard (control) membrane. The raw water flow rate (Q, expressed as cc/min clean deionized water for a nominally forty seven (47) mm test disc (13.5 cm$^2$ test area) under water pressure of 5 psid) has shown about a twenty (20%) percent improvement, while the integrity, as measured by Initial Bubble Point, has surprisingly increased by about six (6%) percent, for the same overall membrane thickness. This improvement potentially provides a double benefit, these being improved clean water flow rate and improved integrity as measured by IBP. The increase in Initial Bubble Point is corroborated by both the increase in membrane Foam-All-Over-Point, and the decrease in the ASTM Mean Flow Pore size rating.

The Example 1 membrane is representative of the advantage of the present invention, where there are two geometrically symmetric, separate and self-sufficient qualifying zones of small pore size membrane, yielding the highest possible integrity by redundant qualifying layers, separated by a non-restrictive inner zone which contains the reinforcement, without diminishing the performance of the qualifying layers, in a surprisingly thin overall section.

The Example 2 membrane provided a stunning improvement in flow rate over the standard (control) membrane of about seventy eight (78%) percent, while retaining almost the same integrity attributes in IBP and FAOP. The Mean Flow Pore (MFP), a more universally recognized method for mean pore size, of which FAOP is attempting to approximate, shows the expected difference: a larger mean flow pore is consistent with a higher flow rate, and this indicates that there is, by the flow averaging method, a wider distribution of pore sizes in the Example 2 membrane when compared to the control membrane. This does not, however, diminish the importance of the flow improvement with essentially the same Initial Bubble Point, which is a rating of the single largest pore on the membrane, and a measurement which the microfiltration industry has come to rely upon for testing the integrity of a membrane. Thus, Example 2 illustrates another advantage to the membrane of the present invention, which is the ability to produce, in a single membrane, three separate zones of performance which, when oriented by decreasing pore size, can provide a novel, surprisingly thin section combination reinforced prefilter and final filter, having geometric symmetry, good integrity, and very high flow rates.

Example 4

The dopes used in this example were prepared as before in the first three examples. The dopes were produced using Nylon 66 (Monsanto/Solutia Vydyne® 66Z) polymer. Characteristics of these dopes processed as standard dry double layer non-reinforced membrane are given in Table III.

TABLE III

Dopes for Example 4

| Dope I.D. | Dope Type | % Solids | Viscosity (cp) | IBP (psig) | FAOP (psig) | Thickness (mils) | Q (cc/min) | M.F.P. (micron) |
|---|---|---|---|---|---|---|---|---|
| 97A012 | "A" = Smaller Pore | 14.5 | 3050 | 51.7 | 65.3 | 7.8 | 30.6 | 0.336 |
| 97A016 | "B" = Larger Pore | 12.5 | 1500 | 23.5 | 30.3 | 7.5 | 205.0 | 0.789 |

Another geometrically symmetric and pore size symmetric reinforced three zone membrane, with an "open" (large pore size) scrim impregnation was prepared.

A non-woven fiber spunbonded web suitable for preparation of the present invention (commercially available from Ahlstrom, tradename Hollytex®, Grade# 3257), having a basis weight of nominally thirty two (32) gm/sq.meter was selected for processing. The processing method was essentially the same as disclosed in Example 1. The differences were: Zone one pressure impregnation using large pore size dope 97A016 with an impregnation weight of about six (6) gm/sq.meter of Nylon solids. Zone two and three were essentially simultaneously coated with substantially even layers of the small pore size dope, 97A012. In this example, the total coating weight delivered to the two sides was about nineteen (19) gm/sq.meter of Nylon solids, this total was substantially evenly split between the two sides, so that both zones received about eight (8) to about eleven (11) gm/sq.meter of coating. Quenching, washing, drying and testing were as in the previous examples. The test results for this membrane are shown in Table IV. At the same time, a control membrane was processed, using the small pore size dope 97A012 in Zone one, as well as in Zones two and three. The test results for the control membrane are also shown in Table IV.

TABLE IV

Membrane Test Attributes from Examples 4

| Example # | Dope Type in Zone "3-1-2" | Roll I.D. # | IBP (psig) | FAOP (psig) | Thickness (mils) | Q (cc/min) | M.F.P. (micron) |
|---|---|---|---|---|---|---|---|
| 4 | "A-B-A" | 97A016-05 | 40.5 | 54.0 | 4.7 | 114.0 | 0.554 |
| (control) | "A-A-A" | 97A012-06 | 46.1 | 54.9 | 4.4 | 72.2 | 0.498 |

Discussion of Example 4

A three zone, reinforced membrane having an extremely thin cross-section was produced, as shown above. This example demonstrates the ability of the reinforced zone and the two very thin qualifying zones to provide a reasonably high integrity membrane. It should be noted that the thickness of the filled Hollytex scrim is approximately 3.5 mils. Therefore, the remaining 1.2 mils of the 4.7 mil membrane in Example 4 is shared by zones two and three, leaving only about 0.6 mils of effective qualifying layer on each side of the reinforced zone. However, this thickness was sufficient to provide a flow rate improvement of about fifty eight (58%) percent with only about a twelve (12%) percent loss of integrity as compared to the control membrane.

Example 5

The dopes used in this example were prepared as before. The dopes were produced using Nylon 66 (Monsanto/Solutia Vydyne® 66Z) polymer. Characteristics of these dopes processed as standard dry double layer non-reinforced membrane are given in Table V:

TABLE V

Dopes for Example 5

| Dope I.D. | Dope Type | % Solids | Viscosity, (cp) | IBP (psig) | FAOP (psig) | Thickness (mils) | Q (cc/min) | M.F.P. (micron) |
|---|---|---|---|---|---|---|---|---|
| 97B024 | "A" = Smaller Pore | 14.5 | 2894 | 60.5 | 73.5 | 6.8 | 28.9 | 0.322 |
| 97B011 | "B" = Larger Pore | 12.5 | 1400 | 29.3 | 36.1 | 6.3 | 136.9 | 0.646 |

Another geometrically symmetric and pore size symmetric reinforced three zone membrane, with an "open" (large pore size) scrim impregnation was prepared as described below.

The same substrate was used as in Example 4 (Hollytex®3257) and the processing method was essentially the same as disclosed in Example 1. However, zone one was pressure impregnated using large pore size dope 97B011 with an impregnation weight of about 6 gm/sq.meter of Nylon solids. Zone two and three were simultaneously coated with substantially even layers of the small pore size dope, 97B024. In this example, the total coating weight delivered to the two sides was about 38 gm/sq.meter of Nylon solids. The total coating weight delivered was split between the two sides, so that both zones two and three received about seventeen (17) to about twenty one (21) gm/sq.meter of Nylon solids coating. The grand total application of both dopes (large and small pore size) was thus approximately 44 gm/sq.meter Nylon solids. Quenching, washing, drying and testing were conducted as previously described. The test results for the resulting membrane are shown in Table VI. During the same experiment, a control membrane was processed, using the small pore size dope 97B024 in all three zones. The test results for the control membrane are also shown in Table VI.

TABLE VI

Membrane Test Attributes from Examples 5

| Example # | Dope Type in Zone "3-1-2" | Roll I.D. # | IBP (psig) | FAOP (psig) | Thickness (mils) | Q (cc/min) | M.F.P. (micron) |
|---|---|---|---|---|---|---|---|
| 5 | "A-B-A" | 97B024-05 | 61.6 | 75.8 | 6.1 | 45.7 | 0.357 |
| (control) | "A-A-A" | 97B024-02 | 64.5 | 79.3 | 6.0 | 29.8 | 0.332 |

Discussion of Example 5

As can be seen, as compared to example 4, the nominally higher coating weights used to form the qualifying zones two and three in the present example, example 5, resulted in a very high integrity membrane having an IBP within about five (5%) percent of the control membrane, and a flow rate improvement of about fifty three (53%) percent as compared to the control membrane.

Example 6

The dopes were prepared as previously described. The dopes were produced using Nylon 66 (Monsanto/Solutia Vydyne® 66Z) polymer. Characteristics of these dopes processed as standard dry double layer non-reinforced membrane are given in Table VII:

TABLE VII

Dopes for Example 6

| Dope I.D. | Dope Type | % Solids | Viscosity (cp) | IBP (psig) | FAOP (psig) | Thickness (mils) | Q (cc/min) | M.F.P. (micron) |
|---|---|---|---|---|---|---|---|---|
| 97B066 | "A" = Smaller Pore | 14.5 | 2980 | 71.8 | >90 | 4.5 | 24.8 | 0.219 |
| 97B067 | "B" = Larger Pore | 12.5 | 1772 | 31.8 | 39.3 | 5.6 | 93 | 0.628 |

Still another geometrically symmetric and pore size symmetric reinforced three zone membrane, with an "open" (large pore size) scrim impregnation was prepared.

The same substrate as Example 4 was used, (Hollytex® 3257). The processing method was essentially the same as disclosed in Example 1. However, zone one was pressure impregnated using a large pore size dope 97B067 with an impregnation weight of about 6 gm/sq.meter of Nylon solids. Zone two and three were simultaneously coated with substantially even layers of the small pore size dope, 97B066. In this example, the total coating weight delivered to the two sides was about 24 gm/sq.meter of Nylon solids. The total coating weight delivered was split between the two sides, so that both zones received about 11 to about 13 gm/sq.meter of Nylon solids coating. The grand total application of both dopes (large and small pore size) was thus approximately 30 gm/sq.meter Nylon solids. Quenching, washing, drying and testing were accomplished as before. The test results for this membrane are shown in Table VIII. During the same experiment, a control membrane was processed, using the small pore size dope 97B066 in all three zones. The test results for the control membrane are also shown in Table VIII.

TABLE VIII

Membrane Test Attributes from Examples 6

| Example # | Dope Type in Zone "3-1-2" | Roll I.D. # | IBP (psig) | FAOP (psig) | Thickness (mils) | Q (cc/min) | M.F.P. (micron) |
|---|---|---|---|---|---|---|---|
| 6 | "A-B-A" | 97B066-01 | 71.0 | >90 | 4.6 | 39.6 | 0.261 |
| (control) | "A-A-A" | 97B066-11 | 71.7 | >90 | 4.5 | 29.4 | 0.254 |

Discussion of Example 6

Again, as compared to Example 4, the nominally higher coating weights of qualifying zones two and three in the present example have resulted in a very high integrity membrane, having an IBP within about one (1%) percent of the control membrane, and a flow rate improvement of about thirty five (35%) percent over the control membrane.

This particular example is representative of a 0.1 micron membrane, suitable for use in purifying water for manufacture of semiconductors and integrated circuits, in the electronics industry. The increased clean water flow rate of the new membrane resulting from the new process described in the present application allows for the design of a smaller and less costly water treatment system in constructing a semiconductor fabrication plant, while providing the same high quality finish water at the design demand flow rate.

Summary of Examples

The three zone membranes of the present invention are characterized as having markedly improved flow rates in filtration applications, for their pore size attributes, as compared to standard products now common in the membrane filtration industry. The relatively thin cross-sections of these three zone, membrane products result in membrane cartridges having more surface area and even higher throughputs. This translates into a higher value added product for the filtration customer.

It is believed that routine experimentation with substrates, pre-treatments, zone coating weights, polymers, dope viscosity, thickness, pore sizes, and orientations of the zones with respect to pore sizes will yield optimized membrane products which have superior performance to existing membrane products. Other membrane applications which will benefit from the ability to customize zone performance will include (as examples), diagnostic products using body fluids, transfer membranes, separation devices, medical devices, and others which will become obvious to those skilled in the arts of membrane science.

As clearly shown in FIGS. 4a–h, the three zone, supported, microporous membrane of the present invention has three distinct, continuous, zones. Also, as clearly shown FIGS. 4b–4d, at least one portion of the scrim encapsulated in the center zone (zone having largest pore size) at least partially protrudes into both the upper and the lower zones (zones having the same, smaller pore size).

As clearly shown in FIGS. 5a–h, the three zone, supported, microporous membrane made in accordance with the present invention has three distinct, continuous, zones. Also, as clearly shown FIGS. 5b–5d, at least one portion of the scrim encapsulated in the center zone (zone having largest pore size) at least partially protrudes into the lower zone (zone having the smaller pore size).

Based on the above, it should be clear that the teachings of the present invention which includes the intermingling of the dopes in fluid form from the three dies prior to quench provides the three zone, continuous membrane, as described herein.

Based on the foregoing description, it should now be apparent that the use of the apparatus and the process to produce the three zoned, reinforced membrane described herein will carry out the objects set forth hereinabove. It should also be apparent to those skilled in the art that the process of the present invention can be practiced to manufacture a variety of microporous membranes having at least a single layer of support material at least substantially embedded in a first zone of microporous membrane and having at least one zone of microporous polymer membrane on each opposed surface of the first zone. Similarly, the dope quench solutions, concentration and temperatures thereof as well as the speed at which the scrim is continuously fed through the apparatus can readily be determined by those skilled in the art.

It is important to note that the three zone membrane of the present invention has a discontinuous pore structure with a continuous entanglement of the separate layers/zones of polymer such that the continuous microporous membrane produced is structurally integral.

After formation of the three zone, reinforced, microporous membrane 10 of the present invention, the membrane may be treated in accordance with U.S. Pat. No. 4,473,474, the disclosure of which is herein incorporated by reference, to produce a cationically charge modified microporous membrane particularly suitable for the filtration of parenteral or biological liquid or, in accordance with U.S. Pat. No. 4,473,475, to produce cationically charge modified microporous membrane particularly suitable for the filtration of high purity water required in the manufacture of electronic components, the disclosure of each is incorporated herein by reference.

While experiments have not as yet conducted to verify that the present invention will have the same or similar results when using other ternary phase inversion polymers, it is presently believed that the present invention can be useful in the processing of a large number of ternary phase inversion polymers into membrane or other useful purposes because of the similar chemical compositions and structures. Specifically, since nylon 66 is a member of a group of polymers that are capable of being process into microporous membrane via the phase inversion process, the nature of this process is such that there is a strong probability that the methods and systems of the present invention will be applicable to these other polymers as well, including, but not limited to, nylon 66, nylon 46, nylon 6, polysulfone, polyethersulfone, polyvinylidenediflouride (PVDF) and other ternary phase inversion polymers that form microporous structures through the phase inversion process.

While the articles, apparatus and methods for making the articles contained herein constitute preferred embodiments of the invention, it is to be understood that the invention is not limited to these precise articles, apparatus and methods, and that changes may be made therein without departing from the scope of the invention which is defined in the appended claims.

What is claimed is:

1. A three zone, reinforced, continuous, geometrically symmetrical, microporous membrane prepared by a process comprising the acts of:

providing a porous support material;

providing first, second, and third polymeric dopes, the first dope being formulated to produce a quenched polymeric layer having a pore size which differs from quenched layer pore sizes obtained from at least one of the second and third dopes;

substantially impregnating the porous support material with the first polymeric dope;

coating the second dope over a first side of the impregnated porous support material such that the first and second dopes intermingle at an interface between the first and second dopes;

coating the third dope over a second side of the impregnated porous support material such that the first and third dopes intermingle at an interface between the dopes; and quenching the coated substantially impregnated support material thereby forming the reinforced, continuous, geometrically symmetrical three-zoned microporous membrane, the microporous membrane comprising:

a middle membrane zone having a first pore size, the middle zone comprising the porous support material and a microporous polymer derived from quenching the first polymeric dope;

a second membrane zone having a second pore size, the second zone comprising a microporous polymer derived from quenching the second polymeric dope upon the first side of the substantially impregnated porous support material; and a third membrane zone having a third pore size, the third zone comprising a microporous polymer derived from quenching the third polymeric dope upon the second side of the impregnated porous support material, wherein the first pore size being at least about 20% greater than at least one of the second and the third pore size.

2. The microporous membrane of claim 1 wherein, during the impregnating act, all of the support material is completely covered by the first dope.

3. The microporous membrane of claim 1 wherein, during the impregnating act, at least one side of the support material has portions thereof not completely covered by the first dope.

4. The microporous membrane of claim 1 wherein, during the impregnating act, both sides of the support material have portions thereof not completely covered by the first dope.

5. The microporous membrane of claim 1 wherein, after the quenching act, none of the support material protrudes into either of the zones formed by the second dope or the third dope.

6. The microporous membrane of claim 1 wherein, after the quenching act, at least some portion of the support material protrudes into at least one of the zones formed by the second dope or the third dope.

7. The microporous membrane of claim 1 wherein, after the quenching act, portions of the support material protrude into both of the zones formed by the second dope and the third dope.

8. The microporous membrane of claim 1 further comprising the act of:

providing a controlled vapor zone.

9. The microporous membrane of claim 8 wherein the controlled vapor zone prevents or at least minimizes uncontrolled atmosphere from contacting the dopes.

10. The microporous membrane of claim 8 wherein the controlled vapor zone prevents dope from solidifying on the bottom of the dies.

11. The microporous membrane of claim 8 wherein the controlled vapor zone prevents quenching of the dope before the dopes enter the quenching means.

12. The microporous membrane of claim 1 wherein the second membrane zone and the third membrane zone each has an average pore size of about 10 micron or less.

13. The microporous membrane of claim 1 wherein the second membrane zone and the third membrane zone each has an average pore size ranging from about 0.001 microns to about 5 micron.

14. The microporous membrane of claim 1 wherein the second membrane zone and the third membrane zone each has an average pore size ranging from about 0.02 microns to about 1 microns.

15. The microporous membrane of claim 1 wherein the second membrane zone and the third membrane zone have about the same average pore size.

16. The microporous membrane of claim 1 wherein the pore size of one of the second or the third membrane zones ranges from about 0.5 microns to about 5 microns.

17. The microporous membrane of claim 1 wherein the pore size of one of the second or the third membrane zones ranges from about 0.04 to about 10 microns.

18. The microporous membrane of claim 1 wherein the microporous polymer is formulated from a dope selected from the group consisting of:
   dopes formulated from phase inversion polymers.

19. The microporous membrane of claim 1 wherein low pressure drop and high flow rate are exhibited across the membrane.

20. The microporous membrane of claim 1 wherein the membrane is monolithic.

21. The microporous membrane of claim 1 wherein the average pore size of the middle zone is at least about fifty percent (50%) greater than the average pore size of at least one of the second zone and the third zone of the membrane.

22. The microporous membrane of claim 1 wherein the average pore size of the middle zone is at least about 100% greater, than the average pore size of at least one of the second zone and the third zone of the membrane.

23. The microporous membrane of claim 1 wherein the average pore size of the middle zone is at least about 200% greater than the average pore size of at least one of the second zone and the third zone of the membrane.

24. The microporous membrane of claim 1 wherein the pores of the middle zone have an average size of about ten (10) microns or less.

25. The microporous membrane of claim 1 wherein the pores of the middle zone have an average size of about 0.5 microns to about two (2) microns.

26. The microporous membrane of claim 1 wherein the pores of the middle zone have an average size of about, 0.1 to about one (1.0) microns.

27. The microporous membrane of claim 1 wherein the thickness of the middle zone is from about fifty (50) microns to about one hundred fifty (150) microns.

28. The microporous membrane of claim 1 wherein the thickness of the middle zone is from about seventy-five (75) microns to about one hundred (100) microns.

29. The microporous membrane of claim 1 wherein the thickness of the middle zone is determined by whatever dope volume is necessary to substantially impregnate the scrim being impregnated at any specific time.

30. The microporous membrane of claim 1 wherein the pore size of the second and third zones range is about one (1) micron or less.

31. The microporous membrane of claim 1 wherein the pore size of the second and third zones is from about 0.01 microns to about one (1) microns.

32. The microporous membrane of claim 1 wherein the pore size of the second and third zones is from about 0.2 microns to about 0.5 microns.

33. The microporous membrane of claim 1 wherein the individual thickness of each of the second and third membrane zones range from about twenty-five (25) microns to about one hundred (100) microns.

34. The microporous membrane of claim 1 wherein the individual thickness of the second and third zones is from about thirty-five (35) microns to about sixty (60) microns.

35. The microporous membrane of claim 1 wherein the overall thickness of the membrane does not exceed about ten (10) mils.

36. The microporous membrane of claim 1 wherein the microporous membrane is particularly suitable for the filtration of biological or parenteral fluids.

37. The microporous membrane of claim 1 wherein the membrane is particularly suitable for the filtration of high purity water for the electronics industry.

38. The microporous membrane of claim 1 wherein the membrane may be used with either side of the membrane facing upstream.

39. A three zone, reinforced, continuous, geometrically symmetrical microporous membrane prepared by a process comprising the acts of:
   providing a porous support material;
   providing fist, second, and third polymeric dopes, the first dope being formulated to produce a quenched polymeric layer having a pore size which differs from quenched layer pore sizes obtained from at least one of the second and third dopes;
   substantially impregnating the porous support material with the first polymeric dope;
   coating the second dope over a first side of the impregnated porous support material such that the first and second dopes intermingle at an interface between the first and second dopes;
   coating the third dope over an opposite side of the impregnated porous support material such that the first and third dopes intermingle at an interface between the dopes;
   quenching the coated support material with a quenching means, thereby forming the reinforced, continuous, geometrically symmetrical three-zoned microporous membrane, the microporous membrane comprising:
      a middle membrane zone having a first pore size, the middle zone comprising the porous support material and a microporous polymer derived from quenching the first polymeric dope;
      a second membrane zone having a second pore size, the second zone comprising a microporous polymer derived from quenching the second polymeric dope upon the first side of the impregnated porous support material;
      a third membrane zone having a third pore size, the third zone comprising a microporous polymer derived from quenching the third polymeric dope upon the second side of the impregnated porous support material;
   the first pore size being at least about 20% greater than the second pore size; and,
   the first pore size being different from the third pore size.

40. The microporous membrane of claim 39 wherein, during the pressure impregnating act, all of the support material is completely covered by the first dope.

41. The microporous membrane of claim 39 wherein, during the pressure impregnating act, at least one side of the support material has at least one portion thereof not completely covered by the first dope.

42. The microporous membrane of claim 39 wherein, during the pressure impregnating act, both sides of the support material have at least one portion thereof not completely covered by the first dope.

43. The microporous membrane of claim 39 wherein, after the quenching act, none of the support material protrudes into either of the zones formed by the second or third dope.

44. The microporous membrane of claim 39 wherein, after the quenching act, at least one portion of the support material protrudes into at least one of the zones formed by the second or third dope.

45. The microporous membrane of claim 39 wherein, after the quenching act, portions of the support material protrude into both of the zones formed by the second and third dopes.

46. The microporous membrane of claim 39 further comprising the act of:
   providing a controlled vapor zone.

47. The microporous membrane of claim 46 wherein the controlled vapor zone prevents or at least minimizes uncontrolled atmosphere from contacting the dopes.

48. The microporous membrane of claim 46 wherein the controlled vapor zone prevents dope from solidifying on the bottom of the dies.

49. The microporous membrane of claim 46 wherein the controlled vapor zone prevents quenching of the dope before the dopes enter the quenching means.

50. The microporous membrane of claim 39 wherein the second membrane zone and the third membrane zone each has an average pore size of about 10 micron or less.

51. The microporous membrane of claim 39 wherein the second membrane zone and the third membrane zone each has an average pore size ranging from about 0.001 microns to about 5 micron.

52. The microporous membrane of claim 39 wherein the second membrane zone and the third membrane zone each has an average pore size ranging from about 0.02 microns to about 1 microns.

53. The microporous membrane of claim 39 wherein the pore size of one of the second or the third membrane zones ranges from about 0.5 microns to about 5 microns.

54. The microporous membrane of claim 39 wherein the pore size of one of the second or the third membrane zones ranges from about 0.04 to about 10 microns.

55. The microporous membrane of claim 39 wherein the microporous polymer is formulated from a dope selected from the group consisting of:
   dopes formulated from phase inversion polymers.

56. The microporous membrane of claim 39 wherein low pressure drop and high flow rate are exhibited across the membrane.

57. The microporous membrane of claim 39 wherein the membrane is monolithic.

58. The microporous membrane of claim 39 wherein the average pore size of the middle membrane zone is at least about fifty percent (50%) greater than the average pore size of at least one of the second zone and the third zone of the membrane.

59. The microporous membrane of claim 39 wherein the average pore size of the middle zone is at least about 100% greater, than the average pore size of at least one of the second zone and the third zone of the membrane.

60. The microporous membrane of claim 39 wherein the average pore size of the middle zone is at least about 200% greater than the average pore size of at least one of the second zone and the third zone of the membrane.

61. The microporous membrane of claim 39 wherein the pores of the middle zone have an average size of about ten (10) microns or less.

62. The microporous membrane of claim 39 wherein the pores of the middle zone have an average size of about 0.5 microns to about two (2) microns.

63. The microporous membrane of claim 39 wherein the pores of the middle zone have an average size of about, 0.1 to about one (1.0) microns.

64. The microporous membrane of claim 39 wherein the thickness of the middle zone is from about fifty (50) microns to about one hundred fifty (150) microns.

65. The microporous membrane of claim 39 wherein the thickness of the middle zone is from about seventy-five (75) microns to about one hundred (100) microns.

66. The microporous membrane of claim 39 wherein the thickness of the middle zone is determined by whatever dope volume is necessary to substantially impregnate the scrim being impregnated at any specific time.

67. The microporous membrane of claim 39 wherein the pore size of the second and third zones range is about one (1) micron or less.

68. The microporous membrane of claim 39 wherein the pore size of the second and third zones is from about 0.01 microns to about one (1) microns.

69. The microporous membrane of claim 39 wherein the pore size of the second and third zones is from about 0.2 microns to about 0.5 microns.

70. The microporous membrane of claim 39 wherein the individual thickness of the second and third zones is from about twenty-five (25) microns to about one hundred (100) microns.

71. The microporous membrane of claim 39 wherein the individual thickness of the second and third zones is from about thirty-five (35) microns to about sixty (60) microns.

72. The microporous membrane of claim 39 wherein the overall thickness of the membrane does not exceed about ten (10) mils.

73. The microporous membrane of claim 39 wherein the microporous membrane is particularly suitable for the filtration of biological or parenteral fluids.

74. The microporous membrane of claim 39 wherein the membrane is particularly suitable for the filtration of high purity water for the electronics industry.

75. The microporous membrane of claim 39 wherein the membrane may be used with either side of the membrane facing upstream.

\* \* \* \* \*